(12) United States Patent
Brown et al.

(10) Patent No.: US 6,683,941 B2
(45) Date of Patent: Jan. 27, 2004

(54) CONTROLLING ADVERTISING OUTPUT DURING HOLD PERIODS

(75) Inventors: Michael Wayne Brown, Georgetown, TX (US); Joseph Herbert McIntyre, Austin, TX (US); Michael A. Paolini, Austin, TX (US); James Mark Weaver, Austin, TX (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/022,163

(22) Filed: Dec. 17, 2001

(65) Prior Publication Data

US 2003/0112927 A1 Jun. 19, 2003

(51) Int. Cl.[7] ............................................... H04M 1/64
(52) U.S. Cl. ...................................... 379/88.22; 705/14
(58) Field of Search .................. 379/70, 76, 88.13, 379/88.16, 88.18, 88.2, 88.21, 67, 88.23, 96, 266.01, 266.02, 266.03, 309, 88.22

(56) References Cited

U.S. PATENT DOCUMENTS

| | | | |
|---|---|---|---|
| 5,499,288 A | 3/1996 | Hunt et al. .................... 379/88 |
| 5,557,658 A | * 9/1996 | Gregorek et al. ......... 379/88.25 |
| 5,673,404 A | 9/1997 | Cousins et al. ............. 395/347 |
| 5,790,637 A | 8/1998 | Johnson et al. ............... 379/67 |
| 5,915,001 A | 6/1999 | Uppaluru ................. 379/88.22 |
| 5,940,476 A | 8/1999 | Morganstein et al. .... 379/88.02 |
| 5,946,654 A | 8/1999 | Newman et al. ............ 704/246 |
| 6,014,439 A | * 1/2000 | Walker et al. ......... 379/266.01 |
| 6,038,305 A | 3/2000 | McAllister et al. ......... 379/207 |
| 6,058,364 A | 5/2000 | Goldberg et al. ........... 704/252 |
| 6,101,242 A | 8/2000 | McAllister et al. ...... 379/88.02 |
| 6,122,357 A | 9/2000 | Farris et al. ................ 379/207 |
| 6,178,230 B1 | 1/2001 | Borland ..................... 379/67.1 |

FOREIGN PATENT DOCUMENTS

| | | | | |
|---|---|---|---|---|
| EP | 0585004 A2 | 3/1994 | ............ H04M/3/44 |
| EP | 0676882 A2 | 10/1995 | ............ H04M/1/27 |
| JP | 8139797 A | 5/1996 | .......... H04M/1/274 |
| JP | 10294784 A | 11/1998 | ............ H04M/1/57 |

OTHER PUBLICATIONS

WPAT Derwent 1994–067503.
WPAT Derwent 1995–346415.
WPAT Derwent 1996–315499.
WPAT Derwent 1999–031530.

* cited by examiner

Primary Examiner—Fan Tsang
Assistant Examiner—Ming Chow
(74) Attorney, Agent, or Firm—John R. Biggers; Mark S. Walker; Biggers & Ohanian, PLLC

(57) ABSTRACT

A method, system, and program for controlling advertising output during hold periods are provided. A context for a call on hold is detected. An advertisement is selected for output during a hold space a hold period of the call according to the context. Output of the advertisement during the hold space is controlled, wherein the advertisement is specified according to the context. The advertisement may include text messages, audio messages, video messages, for advertising a product or service or making an announcement.

32 Claims, 11 Drawing Sheets

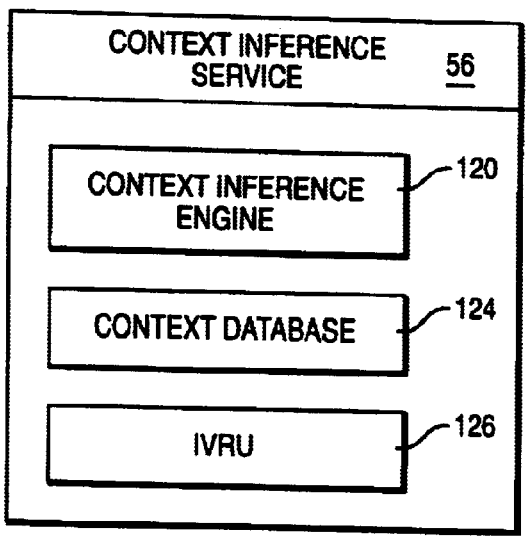
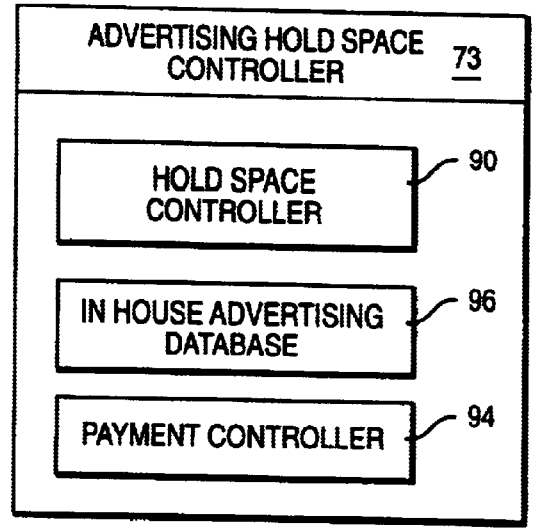
FIG. 8        FIG. 9
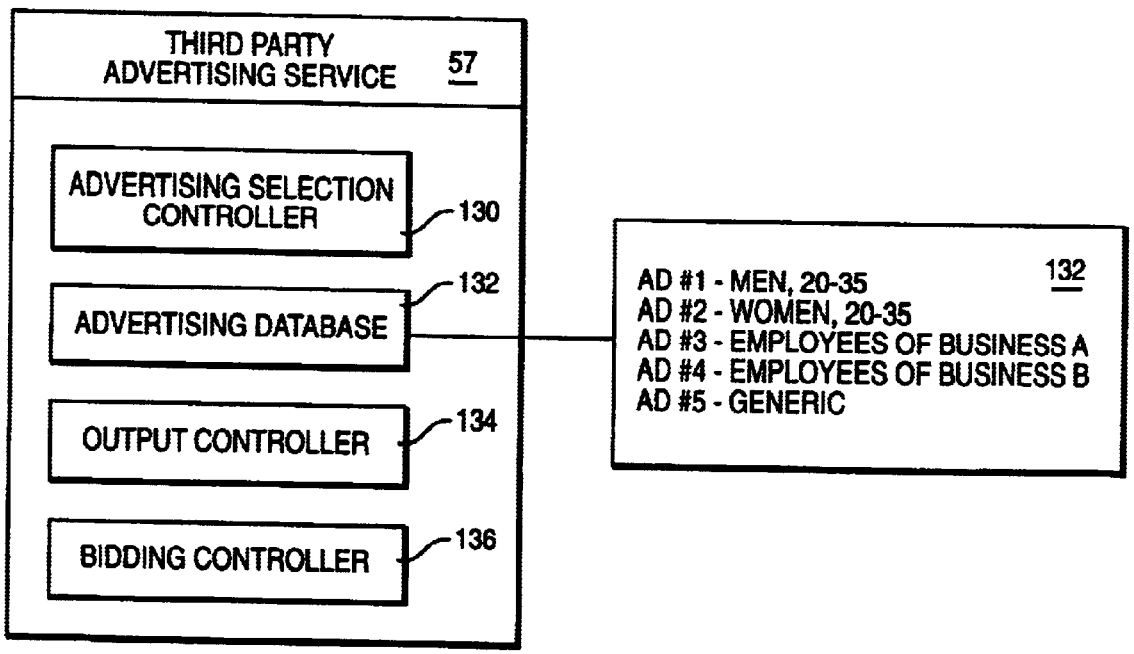
FIG. 10

CONTROLLING ADVERTISING OUTPUT DURING HOLD PERIODS

CROSS-REFERENCE TO RELATED APPLICATIONS

The present application is related to the following co-pending applications:
(1) U.S. patent application Ser. No. 10/015,381
(2) U.S. patent application Ser. No. 10/015,281
(3) U.S. patent application Ser. No. 10/015,265
(4) U.S. patent application Ser. No. 10/015,267
(5) U.S. patent application Ser. No. 10/015,282
(6) U.S. patent application Ser. No. 10/015,280
(7) U.S. patent application Ser. No. 10/022,160
(8) U.S. patent application Ser. No. 10/022,158
(9) U.S. patent application Ser. No. 10/022,161
(10) U.S. patent application Ser. No. 10/022,624
(11) U.S. patent application Ser. No. 10/022,164

BACKGROUND OF THE INVENTION

1. Technical Field

The present invention relates in general to telecommunications and, in particular, to voice identification. Still more particularly, the present invention relates to controlling advertising output during a hold period.

2. Description of the Related Art

Telephone service has created communication channels worldwide, and those channels continue to expand with the advent of cellular and other wireless services. A person can simply take a telephone off-hook and dial a destination number or press a send button and be connected to a telephone line around the world.

Many companies provide telephone-based access to help staff, sales personnel, representatives, and automated menus via a call center. Where high telephone call traffic is typical in telephone access to a company's representatives, a PBX system receives the call and distributes the call to an automatic call distributor (ACD), thus incorporating a hold function in the call center. ACDs are often employed to provide an even and systematic distribution of incoming calls to multiple representatives. In particular, ACDs typically provide incoming calls with a direct connection to an available representative until all representatives are busy. Then, calling parties are placed in a call queue, and selectively connected to a representative once a representative comes available.

Once in a hold queue, a caller may be provided with on hold service options. For example, a caller may be provided with the option of listening to music while on hold. The caller may then be prompted to select a type of music. The on hold system may subscribe to a selection of styles of music. A limitation of such music services is that typically the same couple of songs are played over and over again within a particular category of music. In addition, by providing music to callers on hold, companies lose valuable time with a captive audience that may be utilized to inform and educate.

Some companies utilize on hold time solely to broadcast announcements and advertising. Within a single call center, there may be multiple hold queues, where calls are distributed to hold queues according to the type of question or service needed. Broadcast announcements and advertising may be specified according to queue, but beyond such specification, each caller receives the same generic announcements.

Therefore, in view of foregoing, it would be advantageous to provide a method, system, and program for inserting announcements and advertising during an on hold program, such as music. In addition, it would be advantageous to allow third party advertisers to utilize hold spaces during on hold programs. Further, it would be advantageous to specify the advertising utilized during hold spaces of hold programs according to the context of each call, where the context indicates caller preferences and profile information.

SUMMARY OF THE INVENTION

In view of the foregoing, it is therefore an object of the present invention to provide an improved telecommunications system.

It is another object of the present invention to provide a method, system and program for improved voice identification.

It is yet another object of the present invention to provide a method, system and program for controlling advertising output during on hold periods.

According to one aspect of the present invention, an advertisement is selected for output during a hold space a hold period of the call according to the context. Output of the advertisement during the hold space is controlled, wherein the advertisement is specified according to the context. The advertisement may include text messages, audio messages, video messages, for advertising a product or service or making an announcement.

In particular, a trusted telephone network preferably processes the call and initiates a context inference service to identify the context of a call. The context inference service may be initiated locally within the trusted telephone network or at a server located outside the trusted telephone network, with additional security applied for the communication channel.

According to another aspect of the present invention, a context for a call on hold is transferred to a third party advertiser. Responsive to detecting a hold space during an on hold service program for the call, the call is transferred to the third party advertiser, wherein the third party advertiser fills the hold space with an advertisement specified according to the context of the call.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 8 depicts a block diagram of a context inference service in accordance with the method, system, and program of the present invention;

FIG. 9 illustrates a block diagram of an advertising hold space controller in accordance with the method, system, and program of the present invention;

FIG. 10 depicts a block diagram of a third party advertising service in accordance with the method, system, and program of the present invention;

DETAILED DESCRIPTION OF THE PREFERRED EMBODIMENT

Figure 1:
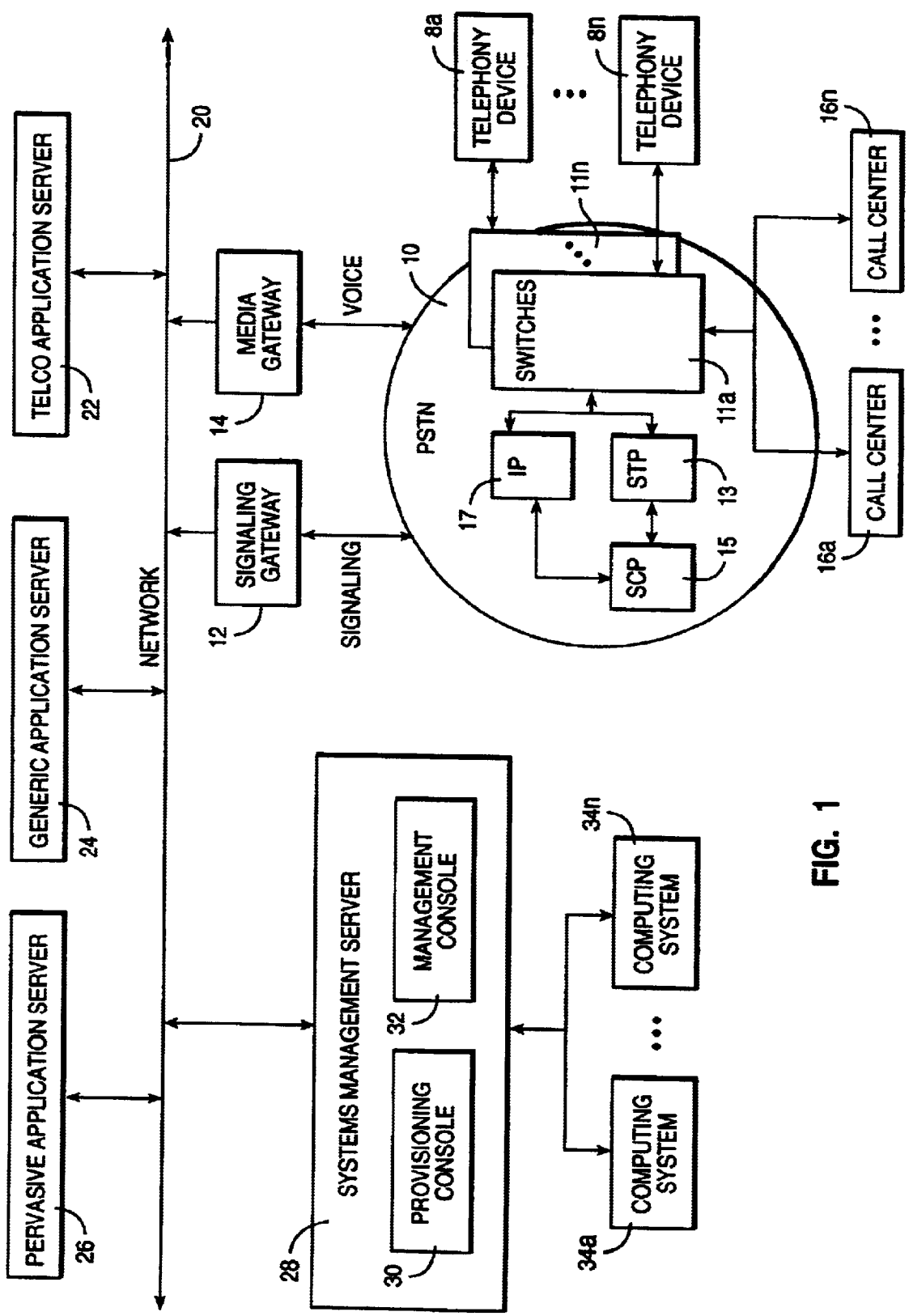
FIG. 1 illustrates a block diagram of a network environment in which the present invention may be implemented.

A method, system, and program for controlling advertising output during on hold periods according to call context are provided. For purposes of the present invention, context may include, but is not limited to, the identity of the caller or callee, the device identity and owner, the location of the caller and callee, on hold preferences of the caller or callee, the path of a call, and billing information for the caller and callee. Location of the caller and callee may include, but is not limited to, the time zone, country, state, city, building location, or GPS location of a caller or callee.

Determining the context for a call is preferably performed by a context inference service located within an Intelligent Peripheral of the trusted telephone network and/or located within a Telco Application service outside the trusted telephone network. As will be further described, the Telco application service located outside the trusted telephone network is enabled to provide services to callers and callees via enhanced security channels.

In particular, according to the present invention, the identities of each party to a call are preferably authenticated in order to determine context for the call. Identity authentication is preferably performed by authenticating the voices of the caller and callee, however other biometric input may also be utilized for identification. Identity authentication may be initiated by the origin device originating the call, the intermediary device processing the call, or the destination device receiving the call. Each of the devices may access a third party or external server to perform the identity authentication. Performance of identity authentication has different advantages depending on the device initiating the identity authentication.

Other context information is received, determined and inferred from context clues. Context clues may include the identities of the caller and callee, the line numbers, the line number subscriber profiles, caller/callee profiles, and other parameters associated with the call. As a call is transferred and forwarded, context clues for each portion of a call path are gathered and utilized to update the context of the call.

In the present invention, either the caller or the callee may place a call on hold. While the caller or callee is waiting on hold, an on hold program is preferably output to the party on hold. The on hold program may include music, games, news, third party access, web browsing, and other services which are advantageous to provide to parties waiting on hold. According to the present invention, hold spaces may be detected or created during an on hold program, where the hold spaces are filled with announcements and advertising. The announcements and advertising may be in house advertising or third party advertising. In house advertising is advertising for the business represented by the on hold call center.

In addition, in the present invention, the context for a call is utilized to determine which announcements and advertising should fill hold spaces for each individual on hold party. For example, two parties on hold may be listening to jazz. A car dealership has subscribed to fill the next hold space. According to call context for each of the two parties, the car dealership may advertise a mid-priced car to one party and a luxury car to the other party.

In particular, a third party may subscribe to utilize a particular number of hold spaces of an on hold system, on hold spaces for a particular time period, or on hold spaces for particular types of call context, for example. Billing for usage of hold spaces is preferably tracked by the on hold system and transferred to the third party advertising system for updates.

For purposes of the present invention, telephony devices are termed origin devices when utilized for origination of a call to an intermediary device and are termed destination devices when utilized for receipt of a call from an intermediary device. Subscribers to a call are termed callers when originating a call and are termed callees when receiving a call. Callers and callees may or may not be line subscribers to the particular telephony device utilized.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

With reference now to the figures, and, in particular, with reference now to FIG. 1, there is depicted a block diagram of a network environment in which the present invention may be implemented. While the present invention is described with reference to one type of network environment, it will be understood by one with skill in the art that the present invention may be implemented in alternate types of network environments.

First, the network environment incorporates a Public Switching Telephone Network (PSTN) 10. As is known in the art the core of PSTN 10 may include multiple telephone networks, each owned by one of multiple independent service providers. Each telephone line is carried by an independent service provider within PSTN 10 and is typically assigned to at least one subscriber.

Switching of a call within an independent service provider's telephone network is considered trusted movement within a trusted network because the call remains within the company's telephone network infrastructure. However, calls may be transferred from one service provider's telephone network to another service provider's telephone network in generally trusted movement. Generally, service providers are in competition with one another and therefore there is general trust in transferring a call, but not trust in sharing of subscriber information beyond a subscriber number and name from one service provider to the next without security features or other arrangements.

Advantageously, each telephone network within PSTN 10 may access a data network functioning as an extension to PSTN 10 via an Intranet. Data networks may include, for example, subscriber profiles, billing information, and preferences that are utilized by a service provider to specialize services. Transfer of information between a service provider's data network and telephone network is trusted movement in sharing of information.

Further, each telephone network within PSTN 10 may access server systems external to PSTN 10 in the Internet Protocol over the Internet or an Intranet. Such external server systems may include an enterprise server, an Internet service provider (ISP), an access service provider (ASP), a personal computer, and other computing systems that are accessible via a network. In the present embodiment, transfer of information between PSTN 10 and server systems accessible via a network 20 is untrusted and therefore may require verification and additional security. Network 20 may be preferably considered an external network.

In the present invention, network 20 may comprise a private network, an Intranet, or a public Internet Protocol network. Specifically, telco application server 22, generic application server 24, pervasive application server 26, and systems management server 28 represent server systems external to PSTN 10 that may be accessed by PSTN 10 over network 20.

In particular, telco application server 22 preferably includes multiple telco specific service applications for providing services to calls transferred to a server external to PSTN 10. In particular, a call may be transferred from PSTN 10 to telco application server 22 to receive at least one service and then the call is transferred back to PSTN 10. PSTN 10 preferably brokers the connection between the telephony device and telco application server 22. Such services may also be provided to calls within PSTN 10, however placing such services at a third party such as telco application server 22, is advantageous because adding services and information to PSTN 10 is time consuming and costly when compared with the time and cost of adding the services through telco application server 22.

In accord with an advantage of the present invention, as will be further described, the identity of both the caller and the callee may be authenticated by one of telephony devices 8a-8n, PSTN 10, or by telco application server 22. By authenticating the actual identity of the person making a phone call and the person receiving the phone call, rather than the identification of a device from which a call is made and received, an enhanced specialization of services to subscribers may be performed.

An authentication service within telco application server 22 may include identification and verification of the identity of a caller and/or callee of a particular call. Such a service may require that subscribers provide voice samples when setting up a subscription. The stored voice samples may then be compared against voice samples received for a particular call in order to authenticate the identity of a current caller or callee of the particular call.

Generic application server 24 preferably accesses independent server systems that provide services. For example, a messaging server, a financial server, an Internal Revenue Service (IRS) server, and database management system (DBMS) server may be accessed in HTTP via network 20. Each of these servers may include a telco service application that requires authentication of the subscriber before access is granted. For example, a financial server may provide a telco service application that allows an authenticated subscriber to access current financial records and request stock quotes from the financial server.

Pervasive application server 26 manages services for wirelessly networked devices. In particular, pervasive application server 26 preferably handles distribution of wireless packets of voice and data to wirelessly networked devices utilizing a standard such as short messaging service (SMS) messaging or other 3G standards.

Systems management server 28 manages subscriber personalization via the web. In particular, systems management server 28 includes browser technology that includes a provisioning console 30 for establishing a subscriber profile and a management console 32 for managing and updating the subscriber profile. A subscriber preferably accesses the consoles of systems management server 28 via the Internet utilizing a computing system, such as computing systems 34a-34n.

The subscriber profile may be accessed at systems management server 28 by other external servers and PSTN 10 via network 20. In addition, a local copy of a subscriber profile updated in systems management server 28 may be stored within a particular service provider's data network or telephone network. Each service provider may specify the types of preferences and other information included within a subscriber profile.

In particular, a subscriber may provide a voice imprint when establishing a subscriber profile through provisioning console 30. Other types of authentication information may also be provided including, but not limited to, a password, an eye scan, a smart card ID, and other security devices. In addition, a subscriber may designate billing preferences, shopping preferences, buddy list preferences, and other preferences that enable specialized service to the subscriber when the subscriber's identity is authenticated from the voice imprint or other identification.

Advantageously, a management agent is built into each external server to monitor the services provided by each server according to the authenticated subscriber receiving the services. By monitoring service output according to subscriber, the subscriber may then be billed according to each use of a service.

PSTN 10 preferably includes both voice and data signaling networks that interface with network 20 via gateways. Each of the gateways acts as a switch between PSTN 10 and network 20 that may compress a signal, convert the signal into Internet Protocol (other protocol) packets, and route the packets through network 20 to the appropriate server.

In particular, the voice network interfaces with network 20 through media gateway 14 which supports multiple protocol gateways including, but not limited to, SIP. SIP is a signaling protocol for Internet conferencing, telephony, presence, events notification and instant messaging.

In addition, in particular, the data signaling network interfaces with network 20 through signaling gateway 12 which supports multiple protocol gateways including, but not limited to, parlay protocol gateways and SS7 protocol gateways. Internet servers, such as telco application server 22 may include protocol agents that are enabled to interact with multiple protocols encapsulated in Internet Protocol packets including, but not limited to, SS7 protocol, parlay protocol, and SIP.

Looking into PSTN 10, a telephone network typically includes multiple switches, such as central office switches 11a–11n, that originate, terminate, or tandem calls. Central office switches 11a–11n utilize voice trunks for transferring voice communications and signaling links for transferring signals between signaling points.

Between signaling points, one central office switch sends signaling messages to other central office switches via signaling links to setup, manage, and release voice circuits required to complete a call. In addition, between signaling points, central office switches 11a–11n query service control points (SCPs) 15 to determine how to route a call. SCPs 15 send a response to the originating central office switch containing the routing number(s) associated with the dialed number.

SCPs 15 may be general purpose computers storing databases of call processing information. While in the present embodiment SCPs 15 are depicted locally within PSTN 10, in alternate embodiments SCPs 15 may be part of an extended network accessible to PSTN 10 via a network.

One of the functions performed by SCPs 15 is processing calls to and from various subscribers. For example, an SCP may store a record of the services purchased by a subscriber, such as a privacy service. When a call is made to the subscriber, the SCP provides record of the privacy service to initiate an announcement to a caller to identify themself to the subscriber with the privacy service who is being called. According to an advantage of the invention, authentication of the subscriber receiving the call may be required before the privacy service is initiated for that subscriber.

In particular, network traffic between signaling points may be routed via a packet switch called an service transfer point (STP) 13. STP 13 routes each incoming message to an outgoing signaling link based on routing information. Further, in particular, the signaling network may utilize an SS7 network implementing SS7 protocol.

Central office switches 11a–11n may also send voice and signaling messages to intelligent peripherals (IP) 17 via voice trunks and signaling channels. IP 17 provides enhances announcements, enhanced digit collection, and enhanced speech recognition capabilities.

According to an advantage of the present invention, the identity of a caller is authenticated according to voice authentication. Voice authentication is preferably performed by first identifying a subscriber by matching the name or other identifier spoken with a subscriber name or identifier. Next, voice authentication requires verifying that the voice audio signal matches that of the identified subscriber. However, in alternate embodiments, the identity of a subscriber may be authenticated according to passwords, eye scans, encryption, and other security devices.

In particular, to perform subscriber authentication of audio signals received from callers, IP 17 may include storage for subscriber specific templates or voice feature information, for use in authenticating subscribers based on speech. If a subscriber specific template is not stored on a local IP 17, then a remote IP containing the subscriber specific template may be accessed via a network. In addition, local IP 17 may access systems management server 28 or another repository for voice imprints to access the subscriber specific template.

Where IP 17 authenticates the identity of a caller (e.g. the subscriber placing a call), a voice identifier (VID) representing the authenticated caller identity is transferred as a signal for identifying the caller. In addition, where IP 17 authenticates the identity of a callee (e.g. the subscriber receiving a call), a reverse VID (RVID) including the callee identity is transferred as a signal for identifying the callee.

Alternatively, to perform subscriber authentication of audio signals received from callers, PSTN 10 may broker a caller identity authentication service from telco application server 22. In particular, a signaling channel is opened between central office switches 11a–11n and telco application server 22 via signaling gateway 12. In addition, a voice channel is opened between central office switches 11a–11n and telco application server 22 via media gateway 14.

Because telco application server 22 is located outside of the trusted network, there may be a time delay associated with establishing a connection to telco application server 22 and authenticating the identity of a caller that is longer than a time delay present where a caller identity is authenticated by IP 17.

In addition, because telco application server 22 is located outside of the trusted network, it is advantageous to establish a level of security for transactions between telco application server 22 and central office switches 11a–11n, wherein the level of security is suitable for untrusted communications. A level of security may be implemented by utilizing security based protocols, such as the secure socket layer, and by applying ordinary encryption. In particular, the level of security preferably protects the communication channel between telco application server and PSTN 10 and authenticates the identity of the server from which a caller identity authentication service is accessed. Therefore an additional feature of signaling gateway 12 and media gateway 14 is security verification.

Advantageously, VIDs indicate through text, voice, or video the identity of a caller. For example, a caller's name may be transferred as the identity of a caller. Alternatively, a video clip stored with the subscriber template may be transferred as the identity of a caller. Additionally, VIDs may indicate the identity of the device utilized by a caller to provide context for a call. Further, VIDs may indicate which system or systems have authenticated the caller identity.

After a VID and/or RVID are determined by IP 17, IP 17 and SCP 15 may communicate to designate which services are available according to VID and RVID. Advantageously, by designating services according to a VID and/or RVID, subscribers are provided with services and billed for those services independent of the devices utilized by subscribers. In particular, a 1129 protocol or other protocol may be utilized to enable signal communications between IP 17 and SCPs 15.

In addition, as previously described, caller authentication to determine VIDs and RVIDs may be performed by an external system, such as telco application server 22. The VID or RVID returned from telco application server 22 may be transferred from central office switches 11a–11n to SCP 15 in order to access a subscriber profile associated with the VID or RVID. Alternatively, the VID or RVID may first transfer to IP 17, where additional verification of the caller identity is performed. For example, IP 17 may control distribution of the VID to the caller, where the caller is prompted to enter a password or additional information. IP 17 may then initiate loading the caller profile into central office switches 11a–11n if the additional caller input is verifiable for the VID.

An origin telephony device or destination telephony device may also determine a VID and/or RVID for the caller and/or callee of a call. In particular, telephony devices 8a–8n and call centers 16a–16n may function as origin and destination telephony devices. Each of the telephony devices may include a database of voice templates that may be matched to authenticate the identity of a caller or callee. In addition, each of the telephony devices may access a third party, such as telco application server 22, to authenticate the identity of the caller or callee. In either case, the telephony device transmits a VID and/or RVID with a call to PSTN 10.

Telephony devices 8a–8n may include, but are not limited to wireline devices, wireless devices, pervasive device equipped with telephony features, a network computer, a facsimile, a modem, and other devices enabled for network communication. Advantageously, as previously described, a voice authentication functioning device may be included in each of telephony devices 8a–8n.

In addition, telephony devices 8a–8n may each incorporate a display that provides a visual output of a VID or RVID. Alternatively, such a display may be provided in a separate device connected to the line in parallel to telephones 8a–8n. According to one advantage of the present invention, the identity of the actual caller or actual callee are output to a display in association with a call. In addition, other context information about the caller including, but not limited to, the device from which the call originates or is answered, ratings for a caller or callee, and other context information may be output to a display in association with a call.

Telephony devices 8a–8n are communicatively connected to PSTN 10 via wireline, wireless, ISDN, and other communication links. Preferably, connections to telephony devices 8a–8n provide digital transport for two-way voice grade type telephone communications and a channel transporting signaling data messages in both directions between telephony devices 8a–8n and PSTN 10.

In addition to telephony devices 8a–8n, advanced telephone systems, such as call centers 16a–16n, may be communicatively connected to PSTN 10 via wireline, wireless, ISDN and other communication links. Call centers 16a–16n may include PBX systems, hold queue systems, private network systems, and other systems that are implemented to handle distribution of calls to multiple representatives or agents.

Returning to central office switches 11a–11n, typically, one central office switch exists for each exchange or area served by the NXX digits of an NXX-XXXX (seven digit) telephone number or the three digits following the area code digits (NPA) in a ten-digit telephone number. The service provider owning a central office switch also assigns a telephone number to each line connected to each of central office switches 11a–11n. The assigned telephone number includes the area code (NPA) and exchange code (NXX) for the serving central office and four unique digits (XXXX).

Central office switches 11a–11n utilize office equipment (OE) numbers to identify specific equipment, such as physical links or circuit connections. For example, a subscriber's line might terminate on a pair of terminals on the main distribution frame of one of central office switches 11a–11n. The switch identifies the terminals, and therefore a particular line, by an OE number assigned to that terminal pair. For a variety of reasons, a service provider may assign different telephone numbers to the one line at the same or different times. For example, a local carrier may change the telephone number because a subscriber sells a house and a new subscriber moves in and receives a new number. However, the OE number for the terminals and thus the line itself remains the same.

On a normal call, a central office switch will detect an off-hook condition on a line and provide a dial tone. The switch identifies the line by the OE number. The central office switch retrieves profile information corresponding to the OE number and off-hook line. Then, the central office switch receives the dialed digits from the off-hook line terminal and routes the call. The central office switch may route the call over trunks and possibly through one or more central office switches to the central office switch that serves the called party's station or line. The switch terminating a call to a destination will also utilize profile information relating to the destination, for example to transfer the call if appropriate, to apply distinctive ringing, etc.

In the present invention, authentication of the identity of the caller is preferably initiated in IP 17 or telco application server 22. Once a VID for a caller is received at a central office switch, a context inference application is initiated in IP 17 or telco application server 22. The context inference service preferably requests a caller profile according to VID to determine billing information and personal information about the caller. In addition, the context inference service preferably determines the identity of the device utilized by accessing a device directory, prompting the caller to indicate the device identity, or other methods. Further, the location of the device may be inferred from information provided by the central office switch originating the call, a GPS location, and the location assigned to a line number. Other context information, such as the subject matter of a call and the role in which a caller is placing the call, are preferably determined as well. The context information is preferably loaded with the VID at the central office switch.

The context information may be filtered at the central office switch according to general filtering preferences indicated by a caller in the caller profile. In addition, context information may be filtered according to caller filtering preferences specifically selected for the callee. Context information is then transferred with the call routed by one or more central office switches to a destination central office switch that services the called party's station or line.

Then, in the present invention, the context information is forwarded with a caller VID to the callee device. The callee is enabled to determine whether to answer a call, transfer the call to voice mail, or select from other call handling options, based on knowing the identity of the caller and the context of the call.

For purposes of the present invention, it is assumed that the caller is placed on hold at the callee device, which is a PBX network enabled by an on hold system to place calls on hold until a representative is available. Preferably, the context of the call is utilized to specify on hold services provided to each caller. In, particular, the context of the call is utilized to specify announcements and advertising utilized to fill hold spaces during on hold service programs. An advertising hold space controller may be located within the on hold system, or may be accessible from telco application server 22.

Figure 2:
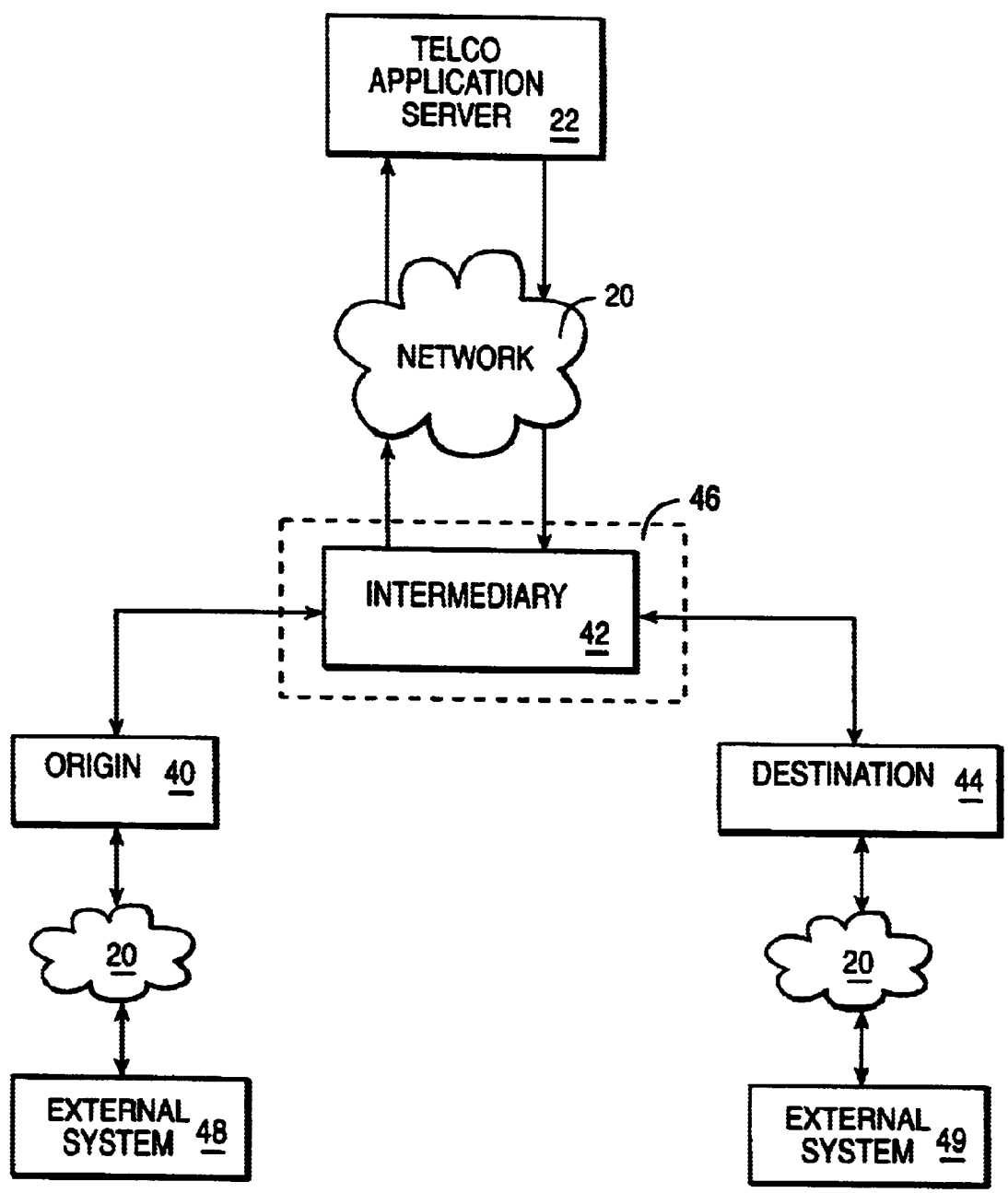
FIG. 2 depicts a block diagram of an identity authentication and context inference system in accordance with the method, system, and program of the present invention.

Referring now to FIG. 2, there is illustrated a block diagram of an identity authentication and context inference system in accordance with the method, system, and program of the present invention.

Origin device 40 is utilized by a caller to initiate a call. The caller is prompted by the device performing caller authentication to provide a voice utterance. A VID for the caller is provided to intermediary device 42 from the device performing caller authentication. The VID is utilized to access a caller profile that includes service preferences and billing information. In addition, the VID is transmitted with the call to destination device 44 for identifying the caller.

In general, caller identity authentication is performed by receiving a voice utterance from a caller, analyzing the voice utterance for sound qualities and content, and attempting to match the sound qualities and content of a voice utterance to a voice template previously recorded for a caller, to authenticate the identity of the caller. If there is a match between the voice utterance and a voice template, then a VID is determined for the caller and utilized to authenticate the caller identity for retrieving a caller profile and billing the caller. However, in alternate embodiments, the identity of a caller may be authenticated according to passwords, eye scans, encryption, and other biometric methods.

Caller identity authentication may be initiated by origin device 40. In particular, origin device 40 may include voice templates and a feature for performing the caller identity authentication. In addition, origin device 40 may access a third party server 48 via network 20, where third party server 48 may provide access to a database of voice templates and/or perform the caller identity authentication. Origin device 40 then transmits a VID determined for the caller to intermediary device 42 for use in specifying services and billing for a call from origin device 40. Origin device 40 may include a caller telephony device, a PBX, a call center, a private switching system, network servers, feature servers, and other systems which provide call origination. Third party server 48 may include a telco application server, a generic application server, a database management system server, and other systems that function outside trusted telephone network 46. In particular, intermediary device 42 may facilitate communication between origin device 40 and network 20.

In addition, caller identity authentication may be initiated by intermediary device 42. Intermediary device 42 may include database systems that store voice templates and an IP for performing caller identity authentication. In addition, intermediary device 42 may access telco application server 22 outside of trusted telephone network 46 via network 20, where telco application server 22 provides a caller authentication service and/or provides access to a database of voice templates. Intermediary device 42 may include a PSTN switching network or networks. However, intermediary device 42 may also include a PBX, a call center, or other private switching system. Further, intermediary device 42 may include network servers, Websphere® (Websphere® is a registered trademark of International Business Machines Corporation) servers, and other systems which provide call processing.

Further, caller identity authentication may be initiated by destination device 44. Destination device 44 may include voice templates and a feature for performing the caller identity authentication. In addition, destination device 44 may access a third party server 49 via network 20, where third party server 49 may provide access to a database of voice templates and/or perform the caller identity authentication. Destination device 44 will prompt a caller to provide a voice utterance at origin device 40, where intermediary device 42 facilitates communications between origin device 40 and destination device 44. Destination device 44 then determines and transmits a VID for the caller to intermediary device 42 for use in specifying services and billing for a call from origin device 40. Destination device 44 may include a callee telephony device, a PBX, a call center, a private switching system, network servers, feature servers, and other systems which provide call receipt. Third party server 48 may include a telco application server, a generic application server, a database management system server, and other systems that function outside trusted telephone network 46. In particular, intermediary device 42 may also facilitate communication between destination device 44 and network 20.

Similarly, a destination device 44 is utilized by a callee to receive a call. Advantageously, an authenticated identity of the callee may be determined as an RVID. Callee identity authentication may be initiated by origin device 40, intermediary device 42, or destination device 44, in a manner similar to initiation of caller identity authentication, as described above.

In particular, in the present invention, both the identity of an intended callee and the identity of an accessed callee may be determined in RVIDS. The intended callee RVID may be authenticated, for example, from a messaging system utilized by the callee.

In addition to authenticating the identity of a caller or callee in a VID or RVID, the context of the call is preferably determined and transmitted as part of the VID or RVID or separate therefrom. Origin device 40, intermediary device 42, telco application server 22, and/or destination device 44 may include context inference services that perform context inference services. A context inference service may utilize context information gathered from multiple databases and may gathered context information directly from a caller or callee in response to prompts.

Context may include, but is not limited to, an intended callee, a subject matter of a call, a device identity, the location of an origin or destination device, billing information, service subscriptions, the path of a call, and other information which may provide a caller or callee with context of a call. Information for determining the context of a call may be gathered from a caller or callee profile, from routing information utilized by intermediary 42 from a device directory, from systems management server 28, or other databases of information. The context inference service may, for example, infer the subject matter of a call as either business or personal based on the identity of the device from which a call originates and the location of that device. Alternatively, the subject of a call as either a business subject or personal subject may be inferred from the billing information context.

A VID or RVID may be transferred in multiple protocols, including, but not limited to, Interface Definition Language (IDL). A VID or RVID may include a range of information, where each type of information may be tagged or identified in some other manner. For example, the following tagged VID may be transmitted to represent an authenticated identity of a caller and context of the call:

[caller name] Jon Smith

[caller device] Jane Doe's cell phone

[caller location] Central Time zone, Austin, Tex.

[caller music pref] Jazz

[caller income level] 80–100

[caller occupation area] manager, engineer

[caller age] 45

[call subject] Product A

[call billing] Jon Smith's business service provider C

[authenticated by] Jane Doe's cell phone, service provider C

Figure 3:
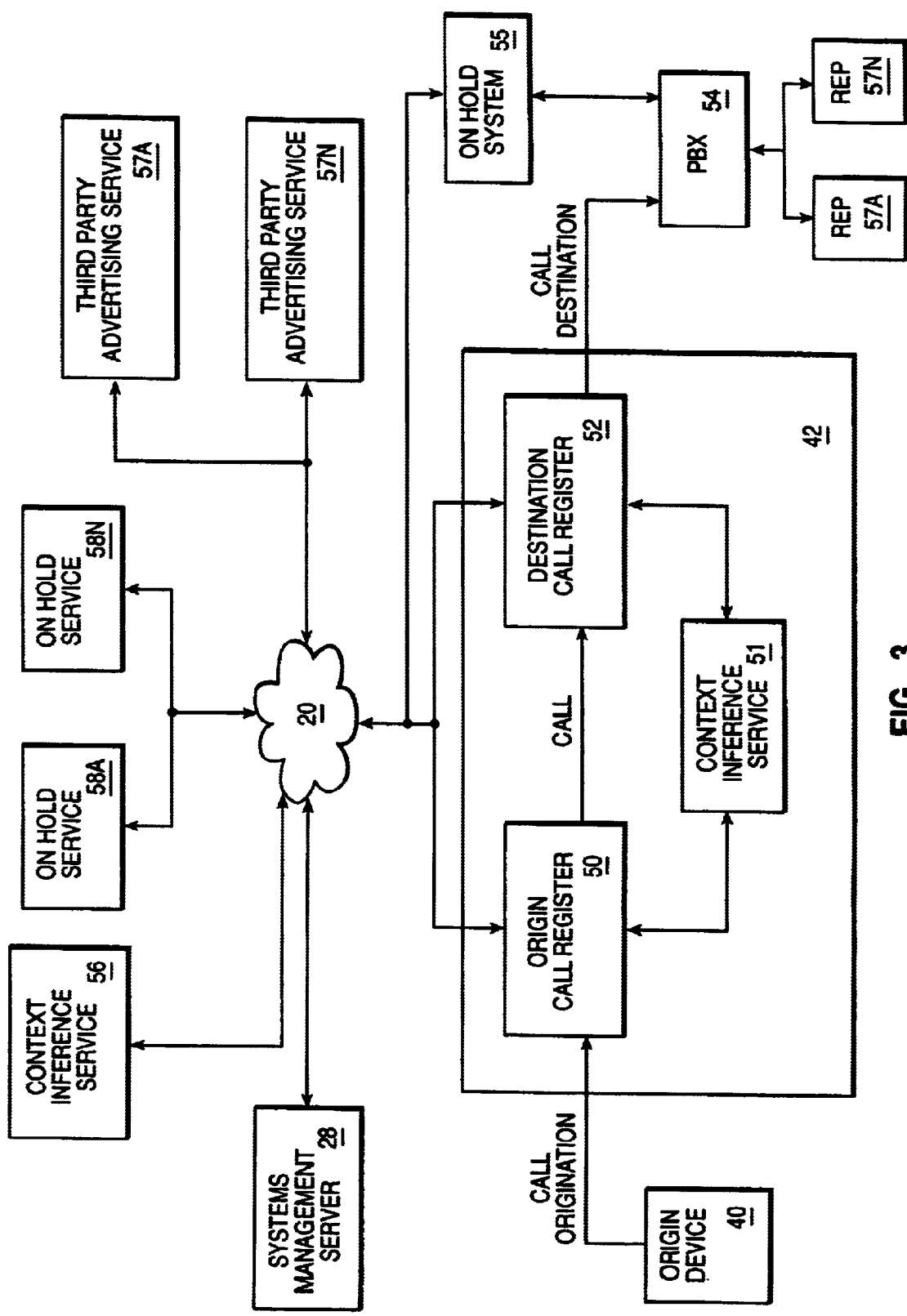
FIG. 3 illustrates a block diagram of the flow of a call through a context inference system in accordance with the method, system, and program of the present invention.

With reference now to FIG. 3, there is depicted a block diagram of the flow of a call through a context inference system in accordance with the method, system, and program of the present invention. As illustrated, origin device 40 transfers a call request to intermediary device 42. The call request may be an off-hook condition for a wireline device or a network service connection request for a wireless device.

Preferably, a switching service receiving the call request establishes an origin call register 50 and retrieves a line subscriber profile for the origin device line number. The line subscriber profile may be accessed from an SCP or a data storage system external to trusted telephone network 46.

Next, a context inference service may be initiated by the origin switching service. In particular, a context inference service 51 may be located within trusted telephone network 46 as an IP. Alternatively, a context inference service 51 may be located outside trusted telephone network 46 within a telco application server accessible via network 20.

The context inference service preferably determines context for a call including, but not limited to, who is calling, an intended callee, the device utilized to place the call, the location of the caller, the billing method for the call, the path of the call, and/or the subject matter of the call. In addition, the context inference service preferably determines context for a call including, but not limited to, who receives a call, the path of line numbers utilized to access the callee, the device utilized to receive the call, the location of the callee, and the subject matter available for discussion by the callee. In addition, other categories of context may be determined.

Preferably the identity of the device may be inferred from the line subscriber profile and other information available. A device identity may include a device name, a line number utilized to access the device, and the device type. The device name may be assigned by the line subscriber and output with a signal from the device. Alternatively, the line subscriber profile may indicate the device name. The device type may indicate the type of line utilized to access the device, including, but not limited to, wireline, wireless, or multiplexed. In addition, the device type may indicate the type of device accessed by the line including, but not limited to, a car telephone line, a computer modem line, a PBX land line, a residential line, a business line, or an Asymmetric Digital Subscriber Line (ADSL) multiplexed line.

In addition, the line subscriber profile indicates the billing information and services subscribed to by the line subscriber. Billing information may provide context for whether the line number is a business line or personal line. In addition, a billing context for a call may indicate the party responsible for charges incurred in the call.

Further, a line subscriber profile preferably indicates whether the line number is subscribed to for a wireline device, a wireless device, or both. Additional context information may be inferred from whether a wireline or wireless device is utilized.

In addition to determining the identity of a person associated with a line number, detecting and/or inferring the identity of the device itself is particularly advantageous context information. Device identity may be detected where a line subscriber profile indicates that one wireless device is programmed for use of a particular line number. In addition, origin device 40 may provide a signal indicating the identity of the device. For example, origin device 40 may be programmable to identify a particular office, room or other area in which the device is located.

Further, determining or inferring the location of a device is advantageous context information. For a wireless device, the location of a device may be determined most precisely where a GPS tracking system is utilized by the origin device 40 or intermediary device 42, to determine the exact geographical location of a caller. For a wireline device, the location of the device is fixed according to the location the service is installed for the number.

In addition, for both a wireline and wireless device, a general location of the originated call may be determined from the geographical area covered by the switching center receiving the call. Wireline devices are preferably assigned to a registered address. Wireless devices are preferably provided service by a particular tower or other signal distribution point. The geographical location and area covered by that tower may provide a general location of the origin of a call. As the origin device moves from one wireless coverage area to another, the location may be updated.

The context inference service may infer additional context from location information. For example, the time zone of the caller, the direction of movement of the caller, and other location related information may be inferred from location information.

In addition to extending a dial tone to a caller, an identity of the caller is preferably authenticated and loaded into origin call register 50. A caller profile accessed according to the VID is then accessed and loaded into origin call register 50. The context inference service preferably utilizes the caller profile and VID as additional context clues for the call.

In particular, in retrieving a caller profile according to VID, systems management server 28 may be accessed. Systems management server 28 preferably provides an interface through which an individual may adjust preferences, select services, and provide other information, which is stored and made accessible according to the individual's VID. Systems management server 28 may track services that an individual subscribes to, such as a stock subscription service. In addition, systems management server 28 allows an individual to adjust billing information and view current charges according to VID.

The VID provides the context of who is placing the call. The caller profile provides further context based on the billing information, service subscriptions, personal information, and personal information of the caller.

In addition, a caller profile may include preferences for filtering context information depending on multiple factors. Such factors may include, but are not limited to, the callee, the device placing the call, the device receiving the call, the time of day, a caller's schedule, and other variables selected by the caller.

The subject matter of a call may be determined by prompting a caller to provide a voice or text entry indicating the subject matter of the call. Alternatively, the context inference service may infer the subject matter of a call based on the caller's schedule. The context inference service may also infer the subject matter of a call based on the caller's business or the business associated with the line number utilized by the caller.

In addition, a caller profile may include multiple roles that a caller takes. For example, a caller may be a parent, a business person, a coach, and a volunteer. The context inference service may infer which role the caller is taking depending on other context or may prompt the caller to select a role. Further, the caller may select, at origin device 40, a role for the call when placing the call request.

Further, a caller may place a call on behalf of another caller, where context reflects all effective parties to a call as both the caller and the on behalf of party. For example, an assistant may place a call on behalf of a boss or an employee may place a call on behalf of a company.

In the present invention, a caller may request a line number for the call. In that case, intermediary device preferably transfers the call via a voice channel and the call context via a signal channel a destination service provider, where a destination call register 52 is established to terminate the call.

The destination service provider may initiates at least one of context inference service 51 and context inference service 56 to determine the context of the recipient side of a call. Determining the context of the recipient side of a call may be performed in a manner similar to that described with reference to determining the context of the caller side of a call. In addition, as will be further described, context inferences may be further enhanced when caller side and recipient side context information is combined.

In particular, the identity of the callee answering the call is preferably authenticated and profiles accessed for the line subscriber and/or callee. Returning an RVID determined for the callee to the caller is advantageous because the RVID preferably includes the callee name and information about the transfer.

For purposes of the present invention, the destination device is a private branch exchange (PBX) 54. PBX 54 is a switching system that receives calls and distributes those calls to representatives 57a–57n.

PBX 54 is preferably enabled by an on hold system 55. When calls are received at PBX 54, if none of representatives 57a–57n in general or a specific representative are able to take the call, PBX 54 transfers the call to on hold system 55 until one of the representatives or a specific representative are available. In addition, representatives 57a–57n may place calls on hold after answering the call or when transferring the call to another representative. Preferably, those calls are placed in on hold system 55 until a representative is available.

On hold system 55 is preferably communicatively connected to network 20. Via network 20, on hold system 55 preferably accesses on hold services 58a–58n and third party advertising services 57a–57n. In particular, network 20 may be a local area network. However, preferably network 20 includes the Internet or other wide area network.

On hold services 58a–58n preferably include on hold service programs such as music services, news services, game services, third party communication channel services, and other services that may be provided to a caller on hold. On hold services 58a–58n may be accessible to a single on hold system, however advantageously are accessible to multiple on hold systems via network 20.

On hold services 58a–58n each monitor and record services programs provided according to VID and RVID, such that those services are not repeated often. For example, if a music service is provided to AJon Doe@ by one of on hold services 58a–58n, that service preferably records the songs played to AJon Doe@ according to VID. In addition, a music service may update a caller profile with songs played, such that other music services are enabled to receive a previous play list according to VID and not repeat those songs.

Third party advertising services 57a–57n preferably include text, voice, and video announcements and advertisements stored according to call context. Third party advertising services 57a–57n may subscribe to play advertisements in hold spaces for a particular on hold system or may be available for filling hold spaces in general across multiple on hold systems. A call may be switched to one of third party advertising services 57a–57n, where the service plays an advertisement during a hold space period and then the call is reconnected with an on hold service or transferred to the PBX. Alternatively, a third party advertising service may transfer the advertisement to the call center to insert into a hold space when available.

Preferably third party advertising services 57a–57n receive context for a call and specify advertisements for a particular caller according to the call context. Advertisements may be specified by context for a particular type of business that a caller is placing a call on behalf of, for a particular caller, for a geographical location the call is placed from, for a particular salary range of the caller, for a particular age or gender of the caller, or for other context based criteria. For example, an advertiser may have one advertisement specified for west coast callers and another advertisement specified for east coast callers.

On hold system 55 may also store in house advertisements and announcements that are inserted into hold spaces of on hold service programs. In house advertisements may also be specified by context of a call.

According to an advantage of the present invention, on hold service programs may include advertising hold spaces that are left as blank space for the on hold system to fill. In an example, a radio broadcast may provide a program to on hold system 55 indicating when national and local advertising will be played. On hold system 55 may utilize the advertising times as hold spaces for inserting third party context specified advertising. However, some on hold service programs may not include advertising spaces, such that on hold system 55 may have to create hold spaces. In particular, where an on hold service program is a game or other continual activity, on hold system 55 may have to request a delay to create a hold space or request delays at the end of a game to create a hold space.

According to another advantage of the present invention, advertising utilized to fill hold spaces may include selectable options for a caller. For example, an advertisement may include a web page address that may be selected during the advertisement for voice browsing. In another example, an advertisement may include an option to connect with a representative available to answer questions or take orders based on the advertisement. Further, by a caller listening to an advertisement, the caller may receive an advancement token that allows advancement in the hold queue or the caller may receive a financial token, such as an electronic coupon for the product, that is transferred for storage in association with the caller VID.

The context for a call may be updated to include the third party advertising played to the on hold party and to include any responses made by the on hold party to the advertising. Where an on hold party selects a menu option offered during the advertisement, the context of the call is updated to indicate the selection. The updated context may be utilized by on hold system 55 to adjust charges for playing the third party advertisement where an on hold party makes a menu selection. In addition, the updated context provides a record of advertising heard by an on hold party, such that the on hold party may later access the record to access the menu of options provided by the advertisement.

Figure 4A:
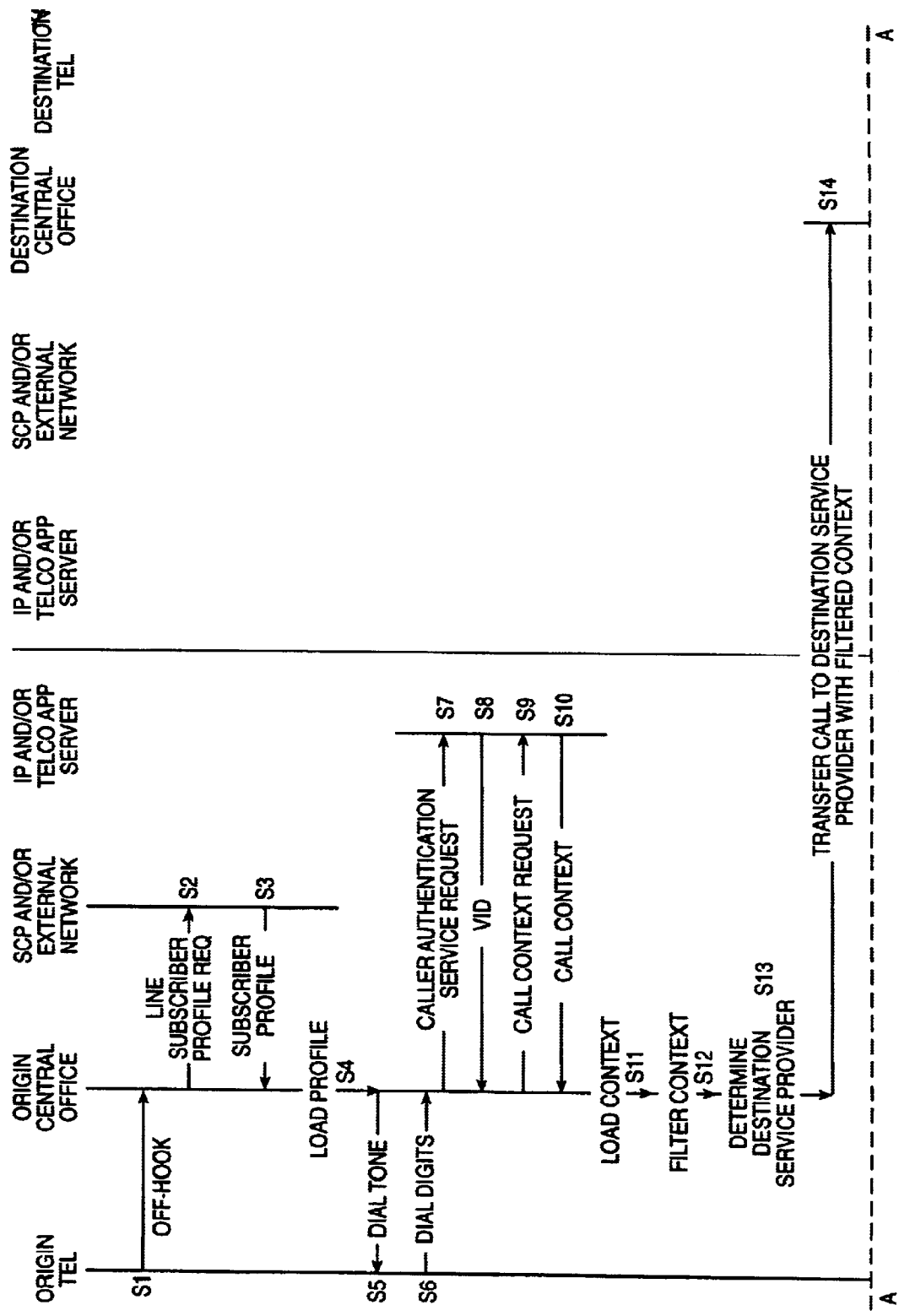
FIG. 4 depicts a flow diagram of a signal flow and processing of a call in accordance with the method, system, and program of the present invention.
Figure 4B:
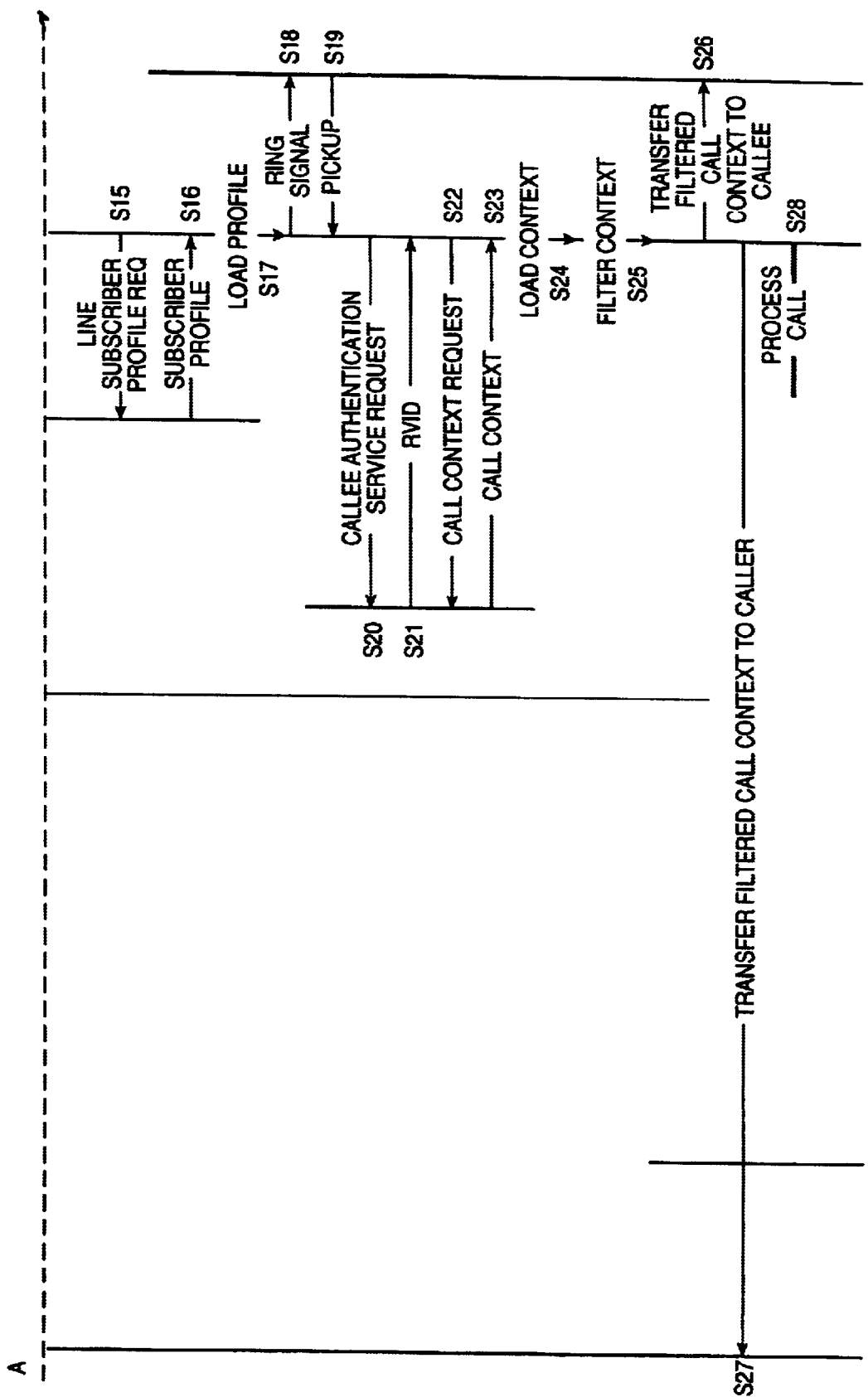

Referring now to FIG. 4, there is depicted a flow diagram of a signal flow and processing of a call in accordance with the method, system, and program of the present invention. A standard telephone device is assumed for the Atel@ origin device and destination device in the present example. However, a similar signal flow may be applied to other types of origin and destination devices, including server systems, private switching networks, and call centers. Further, the flow is described with reference to wireline devices, however is not limited in application to wireline devices.

The caller lifts a handset creating an off-hook state in the origin device and a corresponding change in state of an off-hook signal to the central office (step S1). In response to detecting an off-hook state in the origin device, the central office establishes a register for the call and requests a line subscriber profile from the SCP and/or an external network server (step S2). A line subscriber profile including preferred services and a billing plan is returned to the central office (step S3). The central office loads the line subscriber profile into the call register (step S4) and extends a dial tone to the origin device (step S5).

The origin device then transmits dialed digits to the central office (step S6). A caller may utilize a keypad to enter a telephone number or utilize a voice dial feature if available. Dialed digits may be received at other points in the process and loaded into the call register until needed for processing the call.

Next, the central office extends a caller authentication service request to an IP or to the telco application server (step S7). The caller authentication server will prompt a caller to provide a voice utterance, match the voice utterance with a voice template and authenticate the caller identity as a VID which is returned to the central office (step S8). Alternatively, the origin device or destination device may perform caller authentication, where the VID is received from the origin device or destination device.

Thereafter, the central office extends a call context request to a context inference service available from an IP or telco application server (step S9). The context inference service preferably accesses and loads a caller profile according to VID into the origin call register. Utilizing the line number, line subscriber profile, VID and caller profile, the context inference service preferably determines a context for the call. The call context is returned to the origin central office (step S10).

Next, the context is loaded into the call register (step S11). In addition, the context is filtered according to filtering factors (step S12). In particular, an IP or telco application server provide filtering service.

A destination service provider for the call according to the dialed digits is determined from a directory (step S13). Next, the call is transferred to the destination service provider with filtered context (step S14).

Upon receiving a call at a destination service provider central office, a call register is established for the call and the line subscriber profile request is initiated to a SCP or external network database (step S15). The line subscriber profile is returned to the central office (step S16) and loaded into the call register (step S17).

Next, a ring signal is extended to the destination device (step S18). If the call is answered, a pickup signal is returned to the destination central office (step S19). In response to detecting the pickup, a call authentication service request is initiated (step S20). The identity of the callee is preferably authenticated by an IP or telco application server and returned as a RVID to the destination central office (step S21).

Thereafter, the destination central office extends a call context request to the context inference service at an IP or telco application server to further determine the context of the call (step S22). The context inference service preferably determines context for the call from the recipient side of the call. In addition, the context inference service may determine context from the call in view of both the origination and reception sides of the call. The call context is preferably returned to the destination central office (step S23) and loaded into the call register (step S24). In addition, the context is preferably filtered for receipt by the caller and the callee (step S25).

The filtered call context is preferably transmitted via the signal channel to the destination device (step 26). In particular, the call context is preferably filtered for the callee to indicate the caller and the context of the caller's call request. While in the present example, call context information is transmitted to the destination device after determining call context for the callee, in alternate embodiments, call context may be transmitted to the callee at different points during the call as context is available. For example, the VID and device identity may be transmitted with a ring signal to the destination device, such that the callee is informed of who is calling and what device is calling before answering. In addition, complete context information may be transmitted after the call context for both sides of the call has been determined. Moreover, during a call, call context may continue to be inferred and transmitted to the destination device, such as a changing location of the caller.

The filtered call context is also preferably transmitted via the signal channel back to the origin device (step S27). In particular, the call context is preferably filtered for the caller to indicate the callee and the context of the callee answering the call. While in the present invention the RVID is transmitted as part of the filtered call context, in alternate embodiments the RVID may be transferred after determined.

As an alternative to initiating the context inference service from both the origin central office and the destination central office, only the destination central office may initiate the context inference service for determining a call context based on all the profile and identity information collected at the origin central office and destination central office.

The call is then processed to facilitate communications between the origin device and a destination device accessed in association with the dialed digits (step S28). In particular, where the callee includes an on hold service, the on hold service preferably specifies advertising inserted into hold spaces according to the call context.

Figure 5:
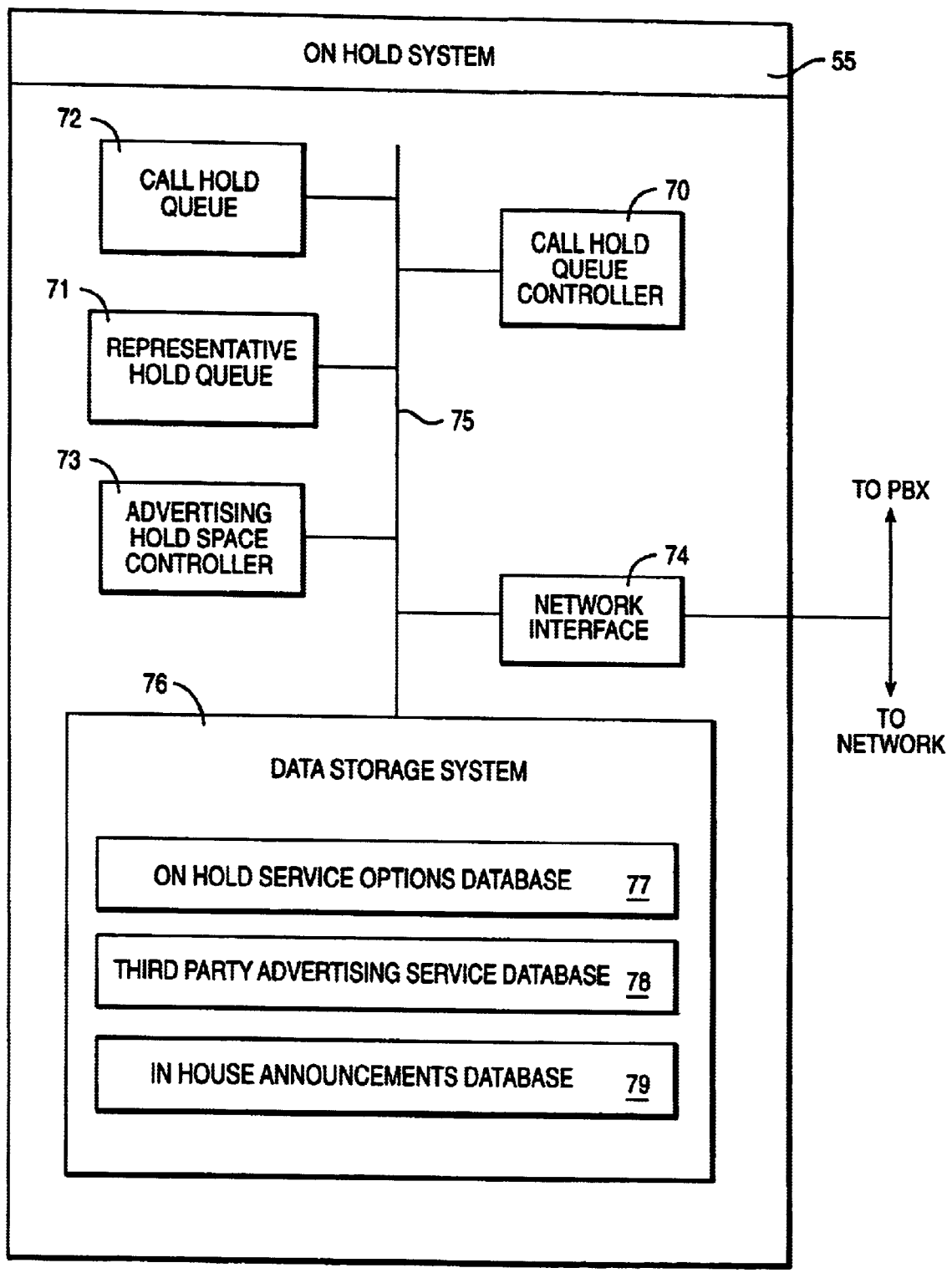
FIG. 5 illustrates an illustrative block diagram of an on hold system in accordance with the method, system, and program of the present invention.

Referring now to FIG. 5, there is an illustrative block diagram of an on hold system in accordance with the method, system, and program of the present invention. As illustrated, on hold system 55 includes a controller 70, a representative hold queue 71, call hold queue 72, an advertising hold space controller 73, a network interface 74, and a data storage system 76 communicatively connected via a bus 75. Additional systems may be connected along bus 75 that are not depicted herein. In particular, controller 70 comprises conventional computer resources including, but are not limited to, at least one processor, memory, a data storage system, system software and application software, that function together to perform the functions described with reference to controller 70.

Network interface 74 preferably communicates with PBX 40 via a telephone network and network 20 via a network connection such as a wide area network (WAN) connection. In particular, network interface 74 receives transfers of calls from PBX 40 and then returns calls to PBX 40 when a representative takes the call off hold from representative hold queue 71 or the call is the next in line within call hold queue 72.

When a call is initially received in on hold system 55, the caller may be prompted by an interactive voice recognition system (IVRU) or voice browser to select categories indicating the reason for a call. However also, in the present invention, the caller may select a subject for a call when placing the call request. The subject is utilized to automatically select categories indicating the reason for a call. While in the present embodiment a single hold queue is depicted, multiple hold queues may be available, where a call is placed in a hold queue according to the reason for a call.

When a call is placed on hold by a representative, the call may be transferred to representative hold queue 71 until the representative takes the call off hold. The services provided to a caller on hold with a representative may be narrowed to shorter service programs. Alternatively, on hold system 55 may just utilize the on hold time with a representative as hold spaces for playing advertisements and announcements, since the on hold time with a representative may vary unpredictably in length. However, on hold time within on hold queue 72 is somewhat predictable based on current hold times and on hold characteristics of each of the callers either on hold or speaking with a representative.

Advertising hold space controller 73 preferably controls the detection and creation of hold spaces during hold periods. In addition, advertising hold space controller 73 coordinates and controls filling the hold spaces during hold periods. Moreover, advertising hold space controller 73 may select context based advertising for hold spaces for each caller.

Data storage system 76 preferably includes an on hold service options database 77, a third party advertising service database 78, and an in-house announcements database 79. On hold service options database 77 preferably includes identifiers for accessing on hold services accessible via network 20 and/or local to on hold system 55. Third party advertising service database 78 preferably includes identifiers for accessing third party advertising services. In addition, third party advertising service database 78 preferably include the billing and usage agreement between on hold service 55 and the third party advertising services. A third party VID and account provider may be stored with a third party advertising service provider, wherein on hold system 55 may request payment with only the VID and account provider information. In-house announcements database 79 preferably includes a database of in-house announcements and advertisements selectable according to context criteria.

Figure 6:
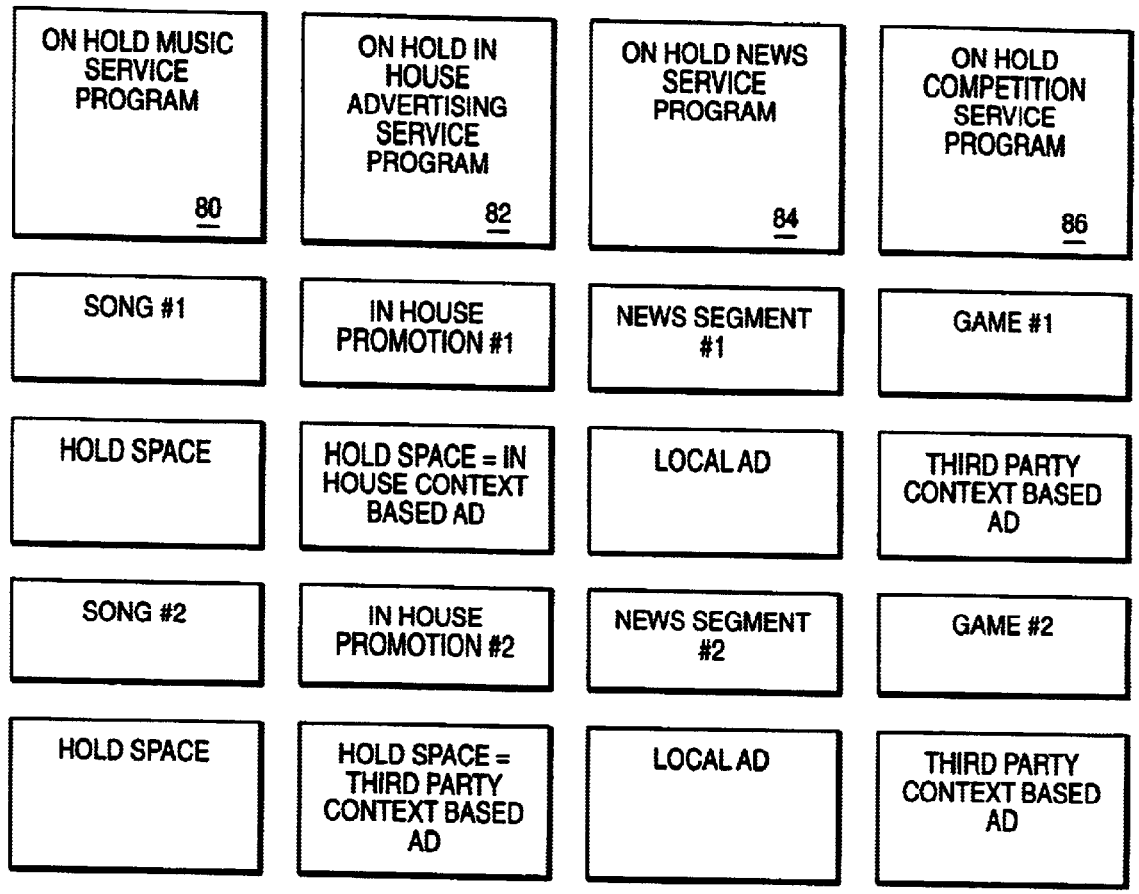
FIG. 6 depicts an illustrative embodiment of multiple on hold service programs in accordance with the method, system, and program of the present invention.

With reference now to FIG. 6, there is an illustrative embodiment of multiple on hold service programs in accordance with the method, system, and program of the present invention.

In the first example, an on hold music service program 80 is accessed for a call. Program 80 includes songs and hold spaces dispersed between the songs. Advantageously, the on hold system inserts advertising into the hold spaces or transfers the call to a third party advertising service that inserts advertising during at least one the hold space. Context based advertising specified for a particular caller is preferably inserted into the hold space.

In the second example, an on hold in-house advertising service program 82 is accessed for a call. Program 82 includes in-house promotional offers, such as product or service discounts and vouchers. Dispersed between in-house promotional offers are hold spaces. In the example, an in-house context based ad is inserted into the first hold space. Then, a third party context based ad is inserted into the second hold space, where the third party context based ad is retrieved from the third party advertising service and played by the on hold in-house advertising service.

In the third example, an on hold news service program 84 is accessed for a call. In the example, news segments are separated by local ads. In the present invention, the on hold service may detect the local ad block and/or receive a advertising schedule from the news service, such that the local ad time can be utilized as a hold space for inserting third party advertising or in-house advertising specified according to call context.

In the fourth example, an on hold competition service program 86 is accessed for a call. Preferably, in this example, the on hold service requests delays at the end of each game for inserting a hold space. In response to the request, the competition service may provide a thirty second or other time interval delay after each competition, such that at third party context based ad may be inserted, and then the caller returns to play another game. Alternatively, the interval delay may be requested during a competition.

Figure 7:
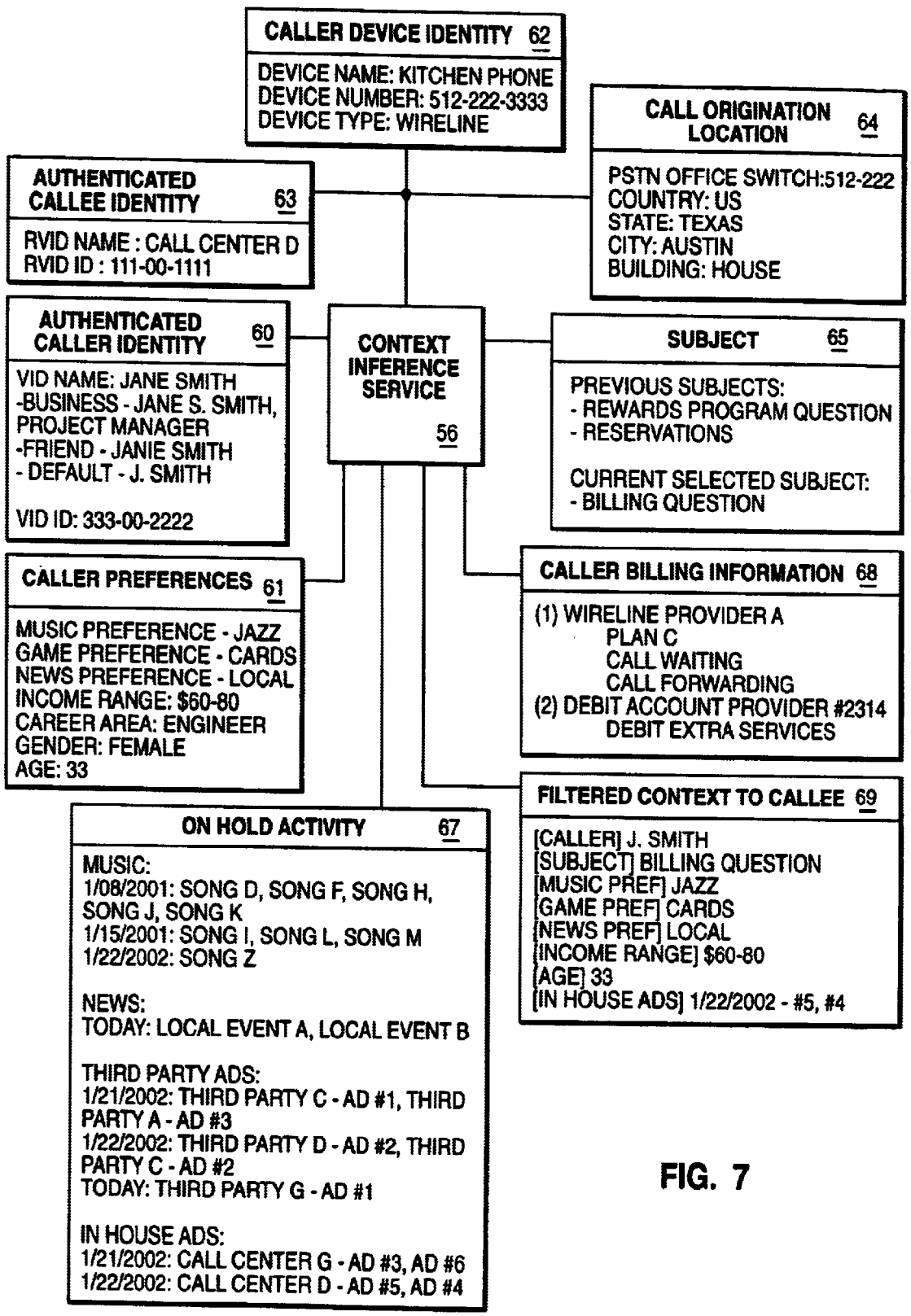
FIG. 7 illustrates an illustrative example of context information associated with a caller in accordance with the method, system, and program of the present invention.

Referring now to FIG. 7, there is depicted an illustrative example of context information associated with a caller in accordance with the method, system, and program of the present invention. As illustrated, multiple types of context information may be accessed and determined by context inference service 56. In addition to the examples depicted, in alternate embodiments, other types of context information may be accessed and determined.

In the example, a call is placed by AJane Smith@ to ACall Center D@. For purposes of illustration, context inference service 56 is determining the context for a call from the perspective of the caller, with reference to the identity of the callee. However, call context may also be determined from the caller and callee perspectives concurrently or independently. In addition, while ACall Center D@ is the initial RVID determined for the callee, once a representative answers the call, the RVID is preferably updated to include the name of the representative.

First, authenticated caller identity context 60 is retrieved to indicate who is calling. Advantageously, the name and identifier of a caller may be determined by authenticating the voice of the caller or utilizing other caller identification. An authenticated identity may also indicate, for example, the device utilized to perform the authentication, the frequency of identity of authentication, and the number to tries to achieve identity authentication.

According to one advantage of the present invention, a caller may provide multiple variations of a name categorized according to the type of callee receiving the VID. For example, a business associate may receive the caller's full name and job title. A friend may receive the caller's nickname. In particular, he VID name is preferably filtered for output to a callee according to caller preferences and the callee identity.

Next, caller device identity context 62 is determined to indicate the device utilized to place the call. An origin device may provide device identification or the context inference service may detect and/or infer the device identity. In the example, device identity context includes the name of the device, the line number associated with the device and the type of device. The name of a device may include a specific phone within a business or home or may indicate the subscriber of the line number. In addition, the name of the device may include a server system or private switching network identifier enabling the origin device. The device type may indicate the type of line and the hardware accessing the line. Here, the device type is indicated as a house wireline. Device identity may be determined according to the service provider associated with a device, the registered address of a line associated with a device, and a signal output by the device indicating device identity.

A call origination location context 64 is also determined to indicate the geographical location of the origination of a call and provide information for determining a device identity. A GPS location of an origin device may be transmitted with the call or detected by an intermediary device. In addition, the context inference service may determine a general location of an origin device based on the geographical area serviced by a PSTN switching network or wireless service provider service area. In the example, the PSTN switching network office switch receiving the call is identified by the numbers serviced by that office switch. The context inference service may then lookup the office switch geographical area, which in the present example includes country, state, and city identifiers. In addition, wireline services are typically registered to a particular address which may be looked up, however only providing a geographical region may be preferred by the caller for security purposes. Further, in the example, the context inference server may lookup the line number to determine the type of building assigned to the line number, here Aresidential@.

In addition, caller billing information context 68 is provided to indicate the billing selections of a caller. Each caller may select multiple service providers and billing options that are accessible according to the caller VID. In the example, a caller has selected a wireline provider A and a debit account provider. Wireline provider A preferably services the current call. Extra services requested by the caller are preferably charged to the caller's debit account. In addition, where a caller places an order for a product or service via the call, the account provider the order costs are preferably charged to the caller's debit account. The context inference engine may filter billing information to indicate a portion of a call the caller will pay for, service available for the call, and whether the caller will pay for additional services.

A subject context 65 indicates previous subjects of calls by the caller from the device. The caller may be prompted to select from one of these previous subjects, stored according to VID in the caller profile. In the example, previous subjects include a Arewards program question@ and Areservations@. However, the subject of the current call is a Abilling question@, a new subject requested by the caller.

In addition to storing previous subjects according to caller and device, previous subjects may be stored according to the caller/callee combination, and retrieved when the caller/callee combination is detected. Moreover, a caller may be enabled to search through the database of previous subjects, organized according to caller, device, callee, time, location, and other criteria. A caller may also have a list of Afavorite subject matter@ from which quick subject matter selections may be made.

Caller preferences and personal information 61 is preferably accessed from a caller profile according to the caller VID. In particular, a caller may indicate preferences for different types of on hold services. In addition, a caller may provide personal information in categories including, but not limited to, income range, occupation, gender, age, interests, dislikes. and other personal information.

On hold activity 67 is preferably accessed according to VID from a caller profile and/or on hold services. On hold activity 67 includes the programs provided to callers according to date, type of service, and a specific service provider. In addition, on hold activity 67 includes the third party advertising distributed to the caller according to date, third party and advertisement number. Advantageously, but storing on hold activity, current and future on hold services may avoid duplicating the programs and advertisements previously provided, unless duplication is intended.

Filtered context to the callee 69 includes a VID and context filtered for transmission to the callee. Although not depicted, the caller preferably sets preferences for filtering the context output to the callee according to the context of the call and the identity of the callee. Here, in addition to allowing output of the caller name and the call subject, the callers preferences, personal information, and a portion of the caller's on hold history are filtered for distribution to the callee.

Advantageously, in the present invention, filtered context to the callee may be utilized to specify advertising and announcements provided during hold spaces of an on hold period. In this particular example, advertising may be specified for the caller, for the subject, for the income level, and/or for the gender. In addition, in-house ads may either be duplicates of those provided on A1/22/2002" or may be different, depending on advertising goals.

With reference now to FIG. 8, there is illustrated a block diagram of a context inference service in accordance with the method, system, and program of the present invention. Context inference service 56 is preferably housed within a computing system including at least a processor, memory, system software, application software, and network software that execute to provide a telco service.

In particular, context inference service 56 includes a context inference engine 120. Context inference engine 120 preferably determines the context for a call through information accessible for the call and through inferences from that information. In addition, context inference engine 120 may filter context information for each entity receiving that information.

In the present invention, determining a context for a call is particularly advantageous where an on hold service utilizes the call context to specify advertisements output to the caller. For example, context such as personal information may allow a third party advertising service to specify an advertisement for that caller during a hold period.

A context database 124 preferably records and stores context for each call processed by context inference service 56. Context database 124 may be later accessed to provide verification and context for billed call transactions. In addition, context database 124 may be accessed by context inference engine 120 to determine current context according to previous context.

An interactive voice recognition unit (IVRU) 126 preferably prompts the caller and callee to provide information required for determining context and detects caller or callee entries. In addition, IVRU 126 may prompt the caller to specify filtering for a particular call.

Referring now to FIG. 9, there is depicted a block diagram of an advertising hold space controller in accordance with the method, system, and program of the present invention. Advertising hold space controller 73 is preferably housed within a computing system including at least a processor, memory, system software, application software, and network software.

In particular, controller 73 includes a hold space controller 90. Hold space controller 90 preferably monitors and creates hold spaces during on hold programs and inserts advertisements and announcements into the hold space. The inserted advertisements and announcements may be accessed from a third party or from in-house advertising database 96. In addition, the controller may switch a call from the on hold service to the third party advertising service for the duration of the hold space, wherein the third party advertising service controls output of an advertisement for the hold space. As previously described, advertising inserted into hold spaces is preferably specified according to the call context.

A payment controller 94 preferably monitors usage of hold spaces and bills third party advertising services according to a plan established with each advertising service. In particular, the advertising service may be billed per use, over a time period, or for a set number of uses, for example. Payment controller may initiate an order for payment from the account provider indicated in an advertising service VID.

An order processing service executing within a telco application server or Intelligent Peripheral may process the order to facilitate transfer of funds from the advertising service account provider to the on hold system account provider.

Another function of hold space controller 90 may include broadcasting a particular call context to a database of third party advertising systems, where advertising systems may then place bids to utilize hold spaces during the call. Payment controller 94 then controls billing to the highest bidder and hold space controller 90 controls insertion of the third party advertising during the hold spaces of the call.

With reference now to FIG. 10, there is illustrated a block diagram of a third party advertising service in accordance with the method, system, and program of the present invention. Third party advertising service 57 is preferably housed within a computing system including at least a processor, memory, system software, application software, and network software that execute to provide a telco service.

As illustrated, an advertising selection controller 130 preferably executes to select advertising from advertising database 132 according to the context of a call. Advertising database 132 may include a single or multiple ad campaigns sorted according to context criteria. Block 133 illustrates an example of ads sorted according to context criteria that may be included in advertising database 132. Each advertisement may include selectable text, audio, and video specified for output according to call context.

An output controller 134 controls output of the selected third party advertisement for a call. In particular, output controller 134 may transfer the advertisement to an on hold system or on hold service for insertion in a hold space. Alternatively, the call may be transferred to advertising service 57, where output controller 134 controls output of the selected advertisement during a hold space to the caller.

A bidding controller 136 controls bidding for hold spaces according to call contexts. In particular, third party advertising service 57 may receive a call context and a request to bid for the next hold space of the call.

Figure 11:
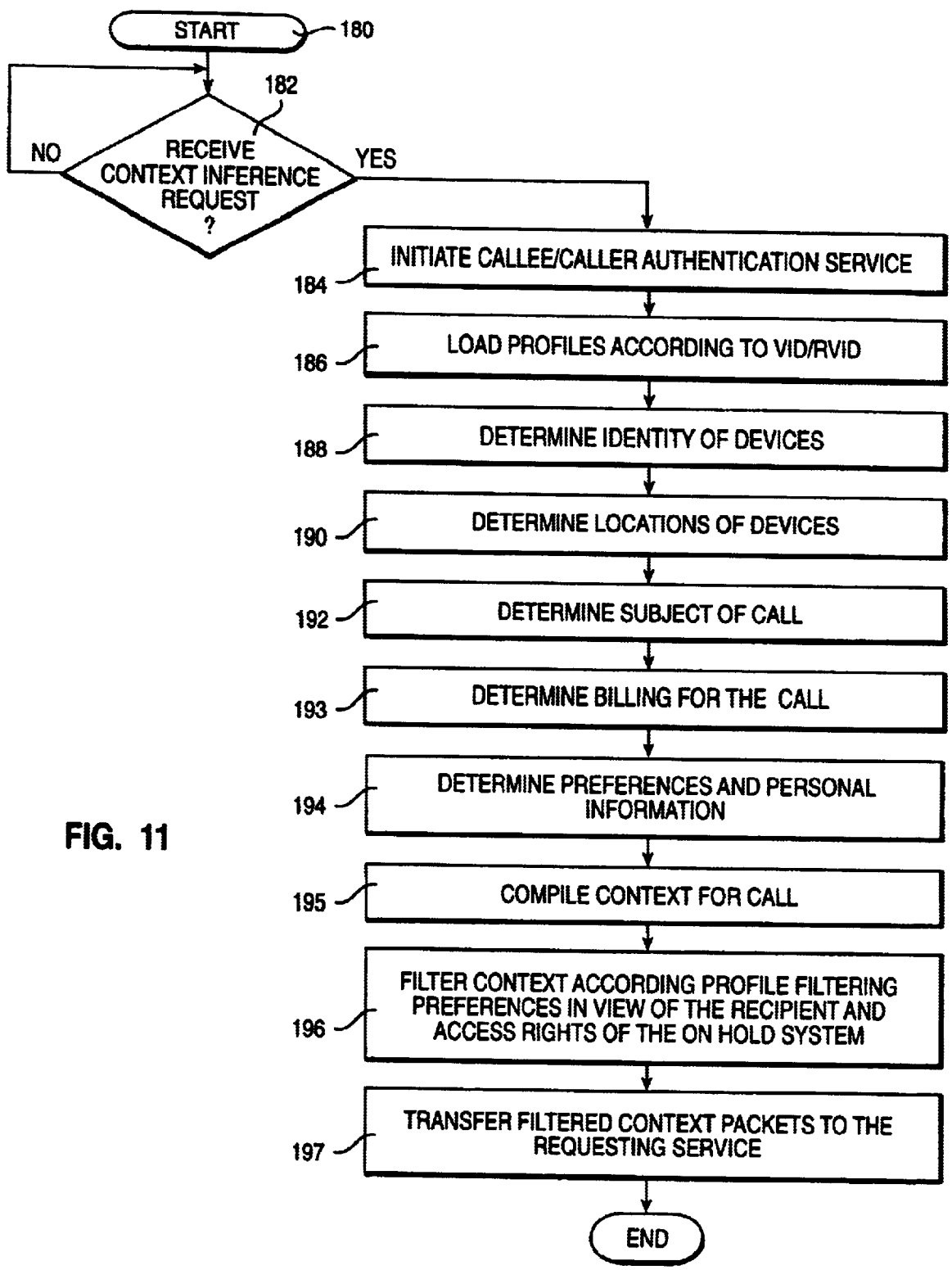
FIG. 11 illustrates a high level logic flowchart of a process and program for determining call context in accordance with the present invention.

With reference now to FIG. 11, there is illustrated a high level logic flowchart of a process and program for determining call context in accordance with the present invention. As depicted, the process starts at block 180 and thereafter proceeds to block 182. Block 182 illustrates a determination as to whether a call context request is received. In the present invention, a call context request may be received from a service provider or from an on hold system. If a call context request is not received, then the process iterates at block 182. If call context request is received, then the process passes to block 184. A call context request may also include subscriber profile information and other call information already loaded by the requesting service provider.

Block 184 depicts initiating a caller/callee identity authentication service. Next, block 186 illustrates loading profiles according to the VID/RVID authenticated for the caller/callee. Alternatively, VID/RVID for the call may be transferred with the call context request. Profiles may be accessed from data management system inside and outside the trusted telephone network and from a local data management system for an on hold system.

Next, block 188 illustrates determining the identity of any devices utilized in the call. Where a server enables a call from an individual telephone device, the identities of the individual telephone device and the server are preferably determined. Device identity may be determined from the line subscriber identity, a device identity output by the device, the type of service subscribed to for the device, the registered address of a wireline, and other available profile information.

Block 190 depicts determining the locations of any devices utilized in the call. Location may be precisely detected from a GPS coordinate. Alternatively, location may be inferred within a general area according to the geographical area covered by an office switch or a wireless tower originating or terminating the call. Further, location may be determined by the physical address assigned to a line number.

Block 192 illustrates determining the subject matter of a call. Subject matter may be inferred, for example, from services subscribed to by the caller/callee, from previous subject matter of calls between the parties, from the location of the calling party, or from the device identities. In addition, a party to a call may be prompted to indicate the subject matter of a call.

Block 193 depicts determining the billing context for a call. Billing context may indicate the service provider providing the telephone service, the party or parties paying for billable telephone services, account providers for orders placed during a call, and other account information.

Block 194 illustrates determining the preferences and personal information for a caller or callee. Preferences may include on hold preferences, product and service preferences, and other types of preferences specified by a caller or callee in a profile. In addition, personal information may include age, gender, occupation, salary range, memberships, subscriptions, and other personal information about a caller.

Thereafter, block 195 depicts compiling the context information for a call. In compiling context information, the information utilized to determine context is preferably consolidated into general context categories. In addition, block 196 illustrates filtering the context information for a call according to caller and callee profile preferences and authorization of an on hold server. Next, block 197 illustrates transferring the call context to the requesting service, and the process ends.

Figure 12:
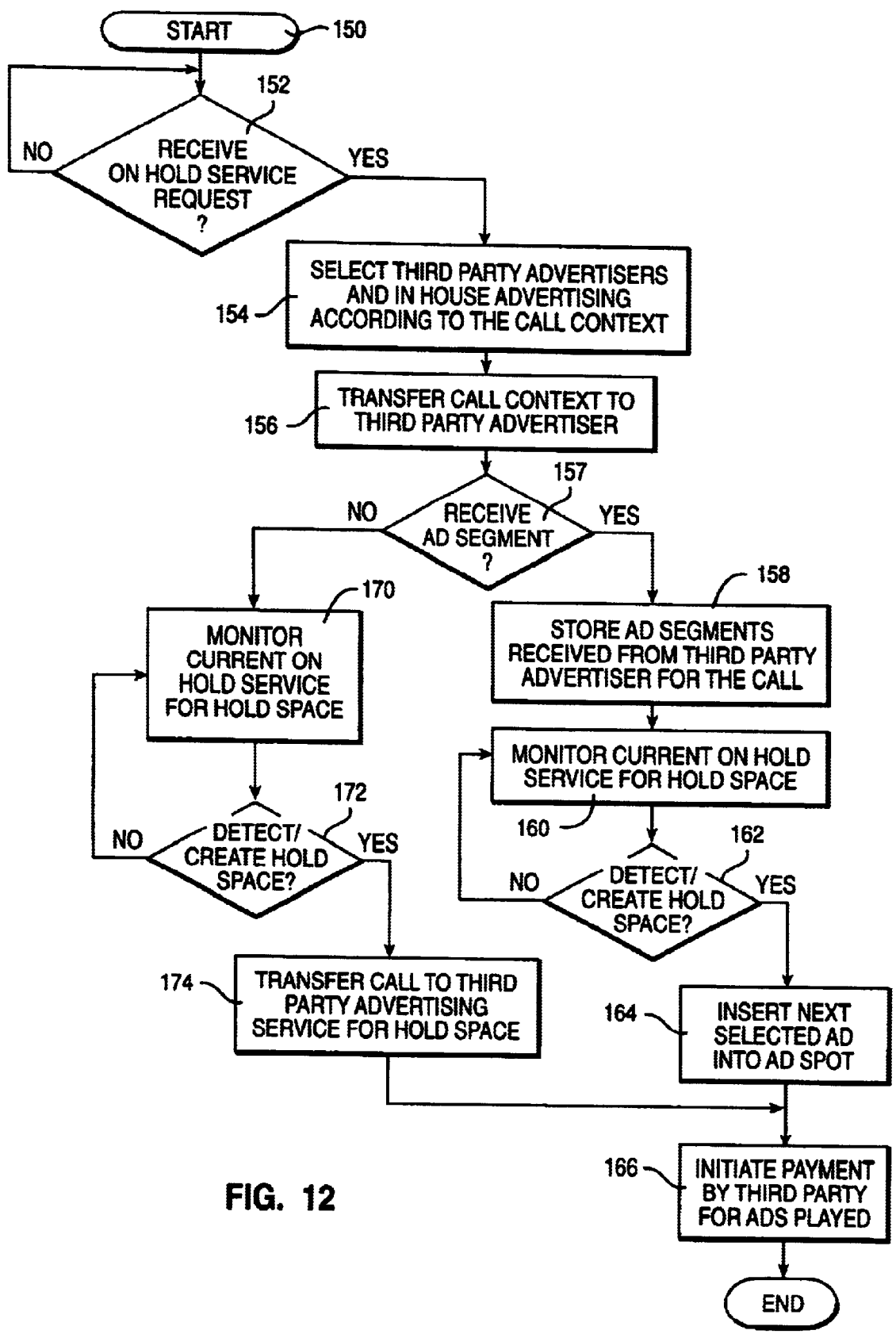
FIG. 12 depicts a high level logic flowchart of a process and program for controlling an advertising hold space service in accordance with the present invention.

Referring now to FIG. 12, there is depicted a high level logic flowchart of a process and program for controlling an advertising hold space service in accordance with the present invention. As illustrated, the process starts at block 150 and thereafter proceeds to block 152. Block 152 depicts a determination as to whether an on hold service request is received. When an on hold service request is received, the process passes to block 154.

Block 154 depicts selecting third party advertisers and in-house advertising according to the call context. In particular, if a third party advertiser is selected, block 156 illustrates transferring the call context to the third party advertiser. Alternatively, the call context may be distributed to multiple third party advertisers with a request to bid on the hold space for the call.

Next, block 157 illustrates a determination as to whether an ad segment is received. If an ad segment is received, then the process passes to block 158. Block 158 depicts storing ad segments received from a third party advertiser for the call. Next, block 160 illustrates monitoring the current on hold service for hold space. Block 162 depicts a determination as to whether hold space is detected or created. If hold space is not detected or created, then the process returns to block 160. If hold space is detected or created, then the process passes to block 164. Block 164 illustrates inserting the next selected ad into the hold space, and the process passes to block 166.

If an ad segment is not received at block 157, but a third party advertising service is selected, then the process passes to block 170. Block 170 depicts monitoring the current on hold service for hold space. Next, block 172 illustrates a determination as to whether a hold space is detected or created. If a hold space is not detected or created, then the process returns to block 170. If a hold space is detected or created, then the process passes to block 174. Block 174 depicts transferring the call to the third party advertising service for the hold space, and the process passes to block 166.

Block 166 depicts initiating payment by third party advertising services for ads played, and the process ends. Alternatively, a third party advertising service may subscribe to a particular number of ads per month or buy a block of hold spaces, such that initiating billing includes maintaining a record of hold spaces utilized.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for controlling an on hold system, comprising:

detecting a context for a call on hold;

distributing said context to a plurality of third party advertising services;

receiving bids for a hold space during said call;

selecting an advertisement from a highest bidder for output during a hold space of a hold period of said call; and controlling output of said advertisement during said hold space, wherein said advertisement is specified according to said context.

2. The method for controlling an on hold system according to claim 1, wherein said context comprises at least one from among an identity of a party to said call, an identity of a party called on behalf of, an identity of a device utilized to place said call, a location of call origination, a selection of on hold preferences for said party to said call, a selection of previous on hold activity for said party to said call, and a selection of personal information for said party to said call.

3. The method for controlling an on hold system according to claim 1, wherein said advertisement comprises at least one from among a text message, selectable text and graphics, an audio message, and a video message.

4. The method for controlling an on hold system according to claim 1, further comprising:

providing an on hold service program during said call; and responsive to detecting said bold space during said on hold service program, inserting said advertisement.

5. The method for controlling an on hold system according to claim 1, further comprising:

providing an on hold service program during said call;

requesting a delay during said on hold service program for said hold space; and responsive to detecting said delay during said on hold service program, inserting said advertisement.

6. The method for controlling an on hold system according to claim 1, further comprising:

providing an on hold service program during said call; and creating said hold space during said on hold service program.

7. A system for controlling an on hold system, comprising:

an on hold system;

means for detecting a context for a call on hold in said on hold system;

means for distributing said context to a plurality of third party advertising services;

means for receiving bids for a hold space during said call;

means for selecting an advertisement from a highest bidder for output during a hold space of a hold period of said call; and means for controlling output of said advertisement during said hold space, wherein said advertisement is specified according to said context.

8. The system for controlling an on hold system according to claim 7, wherein said context comprises at least one from among an identity of a party to said call, an identity of a party called on behalf of, an identity of a device utilize to place said call, a location of call origination, a selection of on hold preferences for said party to said call, a selection of previous on hold activity for said party to said call, and a selection of personal information for said party to said call.

9. The system for controlling an on hold system according to claim 7, wherein said advertisement comprises at least one from among a text message, selectable text and graphics, an audio message, and a video message.

10. The system for controlling an on hold system according to claim 7, further comprising:

means for providing an on hold service program during said call; and means responsive to detecting said hold space during said on hold service program, for inserting said advertisement.

11. The system for controlling an on hold system according to claim 7, further comprising:

means for providing an on hold service program during said call;

means for requesting a delay during said on hold service program for said hold space; and means responsive to detecting said delay during said on hold service program, for inserting said advertisement.

12. The system for controlling an on hold system according to claim 7, further comprising:

means for providing an on hold service program during said call; and means for creating said hold space during said on hold service program.

13. A computer program product for controlling an on hold system, comprising:

a recording medium;

means, recorded on said recording medium, for detecting a context for a call on hold;

means, recorded on said recording medium, for distributing said context to a plurality of third party advertising services;

means, recorded on said recording medium, for receiving bids for a hold space during said call;

means, recorded on said recording medium, for selecting an advertisement from a highest bidder for output during a hold space of a hold period of said call; and means, recorded on said recording medium, for controlling output of said advertisement during said hold space, wherein said advertisement is specified according to said context.

14. The computer program product for controlling an on hold system according to claim 13, further comprising:

means, recorded on said recording medium, for providing an on hold service program during said call; and means, recorded on said recording medium, for inserting said advertisement within a hold space detected during said on hold service program.

15. The computer program product for controlling an on hold system according to claim 13, further comprising:

means, recorded on said recording medium, for providing an on hold service program during said call;

means, recorded on said recording medium, for requesting a delay during said on hold service program for said hold space; and means, recorded on said recording medium, for inserting said advertisement within a delay detected during said on hold service program.

16. The computer program product for controlling an on hold system according to claim 13, further comprising:

means, recorded on said recording medium, for providing an on hold service program during said call; and means, recorded on said recording medium, for creating said hold space during said on hold service program.

17. A method for controlling on hold music, comprising:

detecting a context for a call;

distributing said context to a plurality of third party advertising services;

receiving bids for a hold space during said call;

selecting an advertisement from a highest bidder for output during a hold space of an on hold music service program; and controlling output of said advertisement during said hold space of said on hold music service program.

18. The method for controlling on hold music according to claim 17, wherein said hold space is provided by said on hold music service.

19. The method for controlling on hold music according to claim 17, wherein said hold space is created during a broadcast advertisement space.

20. The method for controlling on hold music according to claim 17, wherein said advertisement is from a third party advertiser.

21. The method for controlling on hold music according to claim 17, wherein said advertisement is from an in house advertisement database.

22. A system for controlling on hold music, comprising:

an on hold system;

means for distributing said context to a plurality of third party advertising services;

means for receiving bids for a hold space during said call;

means for detecting a context for a call on hold at said on hold system;

means for selecting an advertisement from a highest bidder for output during a hold space of an on hold music service program; and means for controlling output of said advertisement during said hold space of said on hold music service program.

23. The system for controlling on hold music according to claim 22, wherein said hold space is provided by said on hold music service.

24. The system for controlling on hold music according to claim 22, wherein said hold space is created during a broadcast advertisement space.

25. The system for controlling on bold music according to claim 22, wherein said advertisement is from a third party advertiser.

26. The system for controlling on hold music according to claim 22, wherein said advertisement is from an in house advertisement database.

27. A computer program product for controlling on hold music, comprising:

a recording medium;

means, recorded on said recording medium, for detecting a context for a call on hold at said on hold system;

means, recorded on said recording medium, for distributing said context to a plurality of third party advertising services;

means, recorded on said recording medium, for receiving bids for a hold space during said call;

means, recorded on said recording medium, for selecting an advertisement from a highest bidder for output during a hold space of an on hold music service program; and means, recorded on said recording medium, for controlling output of said advertisement during said hold space of said on hold music service program.

28. A method for controlling on hold services, comprising:

distributing a context for a call to a plurality of third party advertisers;

receiving bids for a hold space during said call;

transferring said context for the call to a third party advertiser who is a highest bidder;

responsive to detecting a hold space during an on hold service program for said call, transferring said call to said third party advertiser, wherein said third party advertiser fills said hold space with an advertisement specified according to said context of said call.

29. A method for controlling on hold announcements, comprising:

distributing a context for a call to a plurality of third party advertisers;

receiving bids for a hold space during said call;

detecting a context based advertisement for a call from a third party advertiser who is a highest bidder;

responsive to detecting a hold space during an on hold service program for said call, inserting said context based advertisement during said hold space; and billing said third party advertiser for use of said hold space.

30. A method for controlling advertising, comprising:

distributing a context for a call to a plurality of third party advertisers;

receiving bids for a hold space during said call;

receiving, at a third party advertising service who is a highest bidder, a context for a call received at an on hold system; and selecting an advertisement targeted according to said context for said call for output to said call while on hold in said on hold system.

31. The method for controlling advertising according to claim 30, further comprising:

receiving said call at said third party advertising system; and controlling output of said selected advertisement for said call.

32. The method for controlling advertising according to claim 30, further comprising:

transferring said selected advertisement to said on hold system, wherein said on hold system controls insertion of said selected advertisement while said on call is on hold.

* * * * *

UNITED STATES PATENT AND TRADEMARK OFFICE
CERTIFICATE OF CORRECTION

PATENT NO. : 6,683,941 B2
DATED : January 27, 2004
INVENTOR(S) : Michael Wayne Brown et al.

It is certified that error appears in the above-identified patent and that said Letters Patent is hereby corrected as shown below:

Column 27,
Lines 65-66, delete "means for distributing said context to a plurality of third party adversising services;" and insert -- means for detecting a context for a call on hold at said on hold system; --

Column 28,
Lines 1-3, delete "means for receiving bids for a hold space during said call; means for detecting a context for a call on hold at said on hold system;" and insert -- means for distributing said context to a plurality of third party advertising services; means for receiving bids for a hold space during said call; --.

Signed and Sealed this

Twenty-seventh Day of July, 2004

JON W. DUDAS
*Acting Director of the United States Patent and Trademark Office*